(12) United States Patent
Nguyen et al.

(10) Patent No.: US 7,774,280 B2
(45) Date of Patent: Aug. 10, 2010

(54) SYSTEM AND METHOD FOR MANAGING TRANSFER OF RIGHTS USING SHARED STATE VARIABLES

(75) Inventors: Mai Nguyen, Buena Park, CA (US); Xin Wang, Torrance, CA (US); Thanh Ta, Huntington Beach, CA (US); Guillermo Lao, Torrance, CA (US); Eddie J. Chen, Rancho Palos Verdes, CA (US)

(73) Assignee: ContentGuard Holdings, Inc., Wilmington, DE (US)

( * ) Notice: Subject to any disclaimer, the term of this patent is extended or adjusted under 35 U.S.C. 154(b) by 1529 days.

(21) Appl. No.: 10/956,121

(22) Filed: Oct. 4, 2004

(65) Prior Publication Data

US 2005/0060571 A1 Mar. 17, 2005

Related U.S. Application Data

(63) Continuation-in-part of application No. 10/162,701, filed on Jun. 6, 2002.

(60) Provisional application No. 60/331,624, filed on Nov. 20, 2001, provisional application No. 60/331,623, filed on Nov. 20, 2001, provisional application No. 60/331,621, filed on Nov. 20, 2001, provisional application No. 60/296,113, filed on Jun. 7, 2001, provisional application No. 60/296,117, filed on Jun. 7, 2001, provisional application No. 60/296,118, filed on Jun. 7, 2001.

(51) Int. Cl.
G06F 7/04 (2006.01)
G06F 7/30 (2006.01)
H04N 7/16 (2006.01)

(52) U.S. Cl. .......................... 705/59; 726/27

(58) Field of Classification Search .............. 705/50–79
See application file for complete search history.

(56) References Cited

U.S. PATENT DOCUMENTS 3,263,158 A 7/1966 Bargen et al.

(Continued)

FOREIGN PATENT DOCUMENTS

BR 9810967 A 10/2001

(Continued)

OTHER PUBLICATIONS

Workshop on Digital Rights Management for the Web, World Wide Web Consortium, Minutes from the Architecture/Infrastructure Session, Jan. 2001.*

(Continued)

*Primary Examiner*—Andrew J. Fischer
*Assistant Examiner*—Thomas West
(74) *Attorney, Agent, or Firm*—Nixon Peabody, LLP; Marc S. Kaufman; Stephen M. Hertzler

(57) ABSTRACT

A method, system and device for transferring rights adapted to be associated with items from a rights supplier to a rights consumer, including obtaining a set of rights associated with an item, the set of rights including meta-rights specifying derivable rights that can be derived from the meta-; determining whether the rights consumer is entitled to the derivable rights specified by the meta-rights; and deriving at least one right from the derivable rights, if the rights consumer is entitled to the derivable rights specified by the meta-rights, wherein the derived right includes at least one state variable based on the set of rights and used for determining a state of the derived right.

36 Claims, 14 Drawing Sheets

U.S. PATENT DOCUMENTS

| | | |
|---|---|---|
| 3,609,697 A | 9/1971 | Blevins et al. |
| 3,790,700 A | 2/1974 | Callais et al. |
| 3,798,605 A | 3/1974 | Feistel |
| 4,159,468 A | 6/1979 | Barnes et al. |
| 4,200,700 A | 4/1980 | Mäder |
| 4,220,991 A | 9/1980 | Hamano et al. |
| 4,278,837 A | 7/1981 | Best |
| 4,323,921 A | 4/1982 | Guillou |
| 4,361,851 A | 11/1982 | Asip et al. |
| 4,423,287 A | 12/1983 | Zeidler |
| 4,429,385 A | 1/1984 | Cichelli et al. |
| 4,442,486 A | 4/1984 | Mayer |
| 4,529,870 A | 7/1985 | Chaum |
| 4,558,176 A | 12/1985 | Arnold et al. |
| 4,593,376 A | 6/1986 | Volk |
| 4,614,861 A | 9/1986 | Pavlov et al. |
| 4,621,321 A | 11/1986 | Boebert et al. |
| 4,644,493 A | 2/1987 | Chandra et al. |
| 4,658,093 A | 4/1987 | Hellman |
| 4,713,753 A | 12/1987 | Boebert et al. |
| 4,736,422 A | 4/1988 | Mason |
| 4,740,890 A | 4/1988 | William |
| 4,796,220 A | 1/1989 | Wolfe |
| 4,816,655 A | 3/1989 | Musyck et al. |
| 4,817,140 A | 3/1989 | Chandra et al. |
| 4,827,508 A | 5/1989 | Shear |
| 4,868,376 A | 9/1989 | Lessin et al. |
| 4,888,638 A | 12/1989 | Bohn |
| 4,891,838 A | 1/1990 | Faber |
| 4,924,378 A | 5/1990 | Hershey et al. |
| 4,932,054 A | 6/1990 | Chou et al. |
| 4,937,863 A | 6/1990 | Robert et al. |
| 4,949,187 A | 8/1990 | Cohen |
| 4,953,209 A | 8/1990 | Ryder, Sr. et al. |
| 4,961,142 A | 10/1990 | Elliott et al. |
| 4,975,647 A | 12/1990 | Downer et al. |
| 4,977,594 A | 12/1990 | Shear |
| 4,999,806 A | 3/1991 | Chernow et al. |
| 5,010,571 A | 4/1991 | Katznelson |
| 5,014,234 A | 5/1991 | Edwards, Jr. |
| 5,023,907 A | 6/1991 | Johnson et al. |
| 5,047,928 A | 9/1991 | Wiedemer |
| 5,050,213 A | 9/1991 | Shear |
| 5,052,040 A | 9/1991 | Preston et al. |
| 5,058,164 A | 10/1991 | Elmer et al. |
| 5,103,476 A | 4/1992 | Waite et al. |
| 5,113,519 A | 5/1992 | Johnson et al. |
| 5,129,083 A | 7/1992 | Cutler et al. |
| 5,136,643 A | 8/1992 | Fischer |
| 5,138,712 A | 8/1992 | Corbin |
| 5,146,499 A | 9/1992 | Geffrotin |
| 5,148,481 A | 9/1992 | Abraham et al. |
| 5,159,182 A | 10/1992 | Eisele |
| 5,174,641 A | 12/1992 | Lim |
| 5,183,404 A | 2/1993 | Aldous et al. |
| 5,191,193 A | 3/1993 | Le Roux |
| 5,204,897 A | 4/1993 | Wyman |
| 5,222,134 A | 6/1993 | Waite et al. |
| 5,235,642 A | 8/1993 | Wobber et al. |
| 5,247,575 A | 9/1993 | Sprague et al. |
| 5,255,106 A | 10/1993 | Castro |
| 5,260,999 A | 11/1993 | Wyman |
| 5,263,157 A | 11/1993 | Janis |
| 5,263,158 A | 11/1993 | Janis |
| 5,276,444 A | 1/1994 | McNair |
| 5,276,735 A | 1/1994 | Boebert et al. |
| 5,287,408 A | 2/1994 | Samson |
| 5,291,596 A | 3/1994 | Mita |
| 5,293,422 A | 3/1994 | Loiacono |
| 5,301,231 A | 4/1994 | Abraham et al. |
| 5,311,591 A | 5/1994 | Fischer |
| 5,319,705 A | 6/1994 | Halter et al. |
| 5,335,275 A | 8/1994 | Millar et al. |
| 5,337,357 A | 8/1994 | Chou et al. |
| 5,339,091 A | 8/1994 | Yamazaki et al. |
| 5,341,429 A | 8/1994 | Stringer et al. |
| 5,347,579 A | 9/1994 | Blandford |
| 5,381,526 A | 1/1995 | Ellson |
| 5,386,369 A | 1/1995 | Christiano |
| 5,390,297 A | 2/1995 | Barber et al. |
| 5,394,469 A | 2/1995 | Nagel et al. |
| 5,410,598 A | 4/1995 | Shear |
| 5,412,717 A | 5/1995 | Fischer |
| 5,414,852 A | 5/1995 | Kramer et al. |
| 5,428,606 A | 6/1995 | Moskowitz |
| 5,432,849 A | 7/1995 | Johnson et al. |
| 5,438,508 A | 8/1995 | Wyman |
| 5,444,779 A | 8/1995 | Daniele |
| 5,453,601 A | 9/1995 | Rosen |
| 5,455,953 A | 10/1995 | Russell |
| 5,457,746 A | 10/1995 | Dolphin |
| 5,473,687 A | 12/1995 | Lipscomb et al. |
| 5,473,692 A | 12/1995 | Davis |
| 5,485,577 A | 1/1996 | Eyer et al. |
| 5,499,298 A | 3/1996 | Narasimhalu et al. |
| 5,502,766 A | 3/1996 | Boebert et al. |
| 5,504,814 A | 4/1996 | Miyahara |
| 5,504,816 A | 4/1996 | Hamilton et al. |
| 5,504,818 A | 4/1996 | Okano |
| 5,504,837 A | 4/1996 | Griffeth et al. |
| 5,509,070 A | 4/1996 | Schull |
| 5,530,235 A | 6/1996 | Stefik et al. |
| 5,532,920 A | 7/1996 | Hartrick et al. |
| 5,534,975 A | 7/1996 | Stefik et al. |
| 5,535,276 A | 7/1996 | Ganesan |
| 5,539,735 A | 7/1996 | Moskowitz |
| 5,553,143 A | 9/1996 | Ross et al. |
| 5,557,678 A | 9/1996 | Ganesan |
| 5,563,946 A | 10/1996 | Cooper et al. |
| 5,564,038 A | 10/1996 | Grantz et al. |
| 5,568,552 A | 10/1996 | Davis |
| 5,619,570 A | 4/1997 | Tsutsui |
| 5,621,797 A | 4/1997 | Rosen |
| 5,625,690 A | 4/1997 | Michel et al. |
| 5,629,980 A | 5/1997 | Stefik et al. |
| 5,633,932 A | 5/1997 | Davis et al. |
| 5,634,012 A | 5/1997 | Stefik et al. |
| 5,636,346 A | 6/1997 | Saxe |
| 5,638,443 A | 6/1997 | Stefik et al. |
| 5,638,513 A | 6/1997 | Ananda |
| 5,649,013 A | 7/1997 | Stuckey et al. |
| 5,655,077 A | 8/1997 | Jones et al. |
| 5,708,709 A | 1/1998 | Rose |
| 5,708,717 A | 1/1998 | Alasia |
| 5,715,403 A | 2/1998 | Stefik |
| 5,734,823 A | 3/1998 | Saigh et al. |
| 5,734,891 A | 3/1998 | Saigh |
| 5,737,413 A | 4/1998 | Akiyama et al. |
| 5,737,416 A | 4/1998 | Cooper et al. |
| 5,745,569 A | 4/1998 | Moskowitz et al. |
| 5,745,879 A | 4/1998 | Wyman |
| 5,748,783 A | 5/1998 | Rhoads |
| 5,757,907 A | 5/1998 | Cooper et al. |
| 5,761,686 A | 6/1998 | Bloomberg |
| 5,764,807 A | 6/1998 | Pearlman et al. |
| 5,765,152 A | 6/1998 | Erickson |
| 5,768,426 A | 6/1998 | Rhoads |
| 5,787,172 A | 7/1998 | Arnold |
| 5,790,677 A | 8/1998 | Fox et al. |
| 5,812,664 A | 9/1998 | Bernobich et al. |
| 5,825,876 A | 10/1998 | Peterson |
| 5,825,879 A | 10/1998 | Davis |
| 5,825,892 A | 10/1998 | Braudaway et al. |
| 5,838,792 A | 11/1998 | Ganesan |

| | | |
|---|---|---|
| 5,848,154 A | 12/1998 | Nishio et al. |
| 5,848,378 A | 12/1998 | Shelton et al. |
| 5,850,443 A | 12/1998 | Van Oorschot et al. |
| 5,892,900 A | 4/1999 | Ginter et al. |
| 5,910,987 A | 6/1999 | Ginter et al. |
| 5,915,019 A | 6/1999 | Ginter et al. |
| 5,917,912 A | 6/1999 | Ginter et al. |
| 5,920,861 A | 7/1999 | Hall et al. |
| 5,933,498 A | 8/1999 | Schneck et al. |
| 5,940,504 A | 8/1999 | Griswold |
| 5,943,422 A | 8/1999 | Van Wie et al. |
| 5,949,876 A | 9/1999 | Ginter et al. |
| 5,982,891 A | 11/1999 | Ginter et al. |
| 5,987,134 A | 11/1999 | Shin et al. |
| 5,999,624 A | 12/1999 | Hopkins |
| 5,999,949 A | 12/1999 | Crandall |
| 6,006,332 A | 12/1999 | Rabne et al. |
| 6,020,882 A | 2/2000 | Kinghorn et al. |
| 6,044,466 A * | 3/2000 | Anand et al. .................. 726/1 |
| 6,047,067 A | 4/2000 | Rosen |
| 6,073,234 A | 6/2000 | Kigo et al. |
| 6,091,777 A | 7/2000 | Guetz et al. |
| 6,112,181 A | 8/2000 | Shear et al. |
| 6,112,239 A | 8/2000 | Kenner et al. |
| 6,115,471 A | 9/2000 | Oki et al. |
| 6,135,646 A | 10/2000 | Kahn et al. |
| 6,138,119 A | 10/2000 | Hall et al. |
| 6,141,754 A | 10/2000 | Choy |
| 6,157,719 A | 12/2000 | Wasilewski et al. |
| 6,157,721 A | 12/2000 | Shear et al. |
| 6,169,976 B1 | 1/2001 | Colosso |
| 6,185,683 B1 | 2/2001 | Ginter et al. |
| 6,189,037 B1 | 2/2001 | Adams et al. |
| 6,189,146 B1 | 2/2001 | Misra et al. |
| 6,209,092 B1 | 3/2001 | Linnartz |
| 6,216,112 B1 | 4/2001 | Fuller et al. |
| 6,219,652 B1 | 4/2001 | Carter et al. |
| 6,226,618 B1 | 5/2001 | Downs et al. |
| 6,233,684 B1 | 5/2001 | Stefik et al. |
| 6,236,971 B1 | 5/2001 | Stefik et al. |
| 6,237,786 B1 | 5/2001 | Ginter et al. |
| 6,240,185 B1 | 5/2001 | Van Wie et al. |
| 6,253,193 B1 | 6/2001 | Ginter et al. |
| 6,266,618 B1 | 7/2001 | Ye et al. |
| 6,292,569 B1 | 9/2001 | Shear et al. |
| 6,301,660 B1 | 10/2001 | Benson |
| 6,307,939 B1 | 10/2001 | Vigarie |
| 6,327,652 B1 | 12/2001 | England et al. |
| 6,330,670 B1 | 12/2001 | England et al. |
| 6,345,256 B1 | 2/2002 | Milsted et al. |
| 6,353,888 B1 | 3/2002 | Kakehi et al. |
| 6,363,488 B1 | 3/2002 | Ginter et al. |
| 6,389,402 B1 | 5/2002 | Ginter et al. |
| 6,397,333 B1 | 5/2002 | Söhne et al. |
| 6,397,355 B1 * | 5/2002 | Curtis et al. .................. 714/38 |
| 6,401,211 B1 | 6/2002 | Brezak, Jr. et al. |
| 6,405,369 B1 | 6/2002 | Tsuria |
| 6,424,717 B1 | 7/2002 | Pinder et al. |
| 6,424,947 B1 | 7/2002 | Tsuria et al. |
| 6,487,659 B1 | 11/2002 | Kigo et al. |
| 6,516,052 B2 | 2/2003 | Voudouris |
| 6,516,413 B1 | 2/2003 | Aratani et al. |
| 6,523,745 B1 | 2/2003 | Tamori |
| 6,796,555 B1 | 9/2004 | Blahut |
| 2001/0009026 A1 | 7/2001 | Terao et al. |
| 2001/0011276 A1 | 8/2001 | Durst, Jr. et al. |
| 2001/0014206 A1 | 8/2001 | Artigalas et al. |
| 2001/0037467 A1 | 11/2001 | O'Toole, Jr. et al. |
| 2001/0039659 A1 | 11/2001 | Simmons et al. |
| 2002/0001387 A1 | 1/2002 | Dillon |
| 2002/0035618 A1 | 3/2002 | Mendez et al. |
| 2002/0044658 A1 | 4/2002 | Wasilewski et al. |
| 2002/0056118 A1 | 5/2002 | Hunter et al. |
| 2002/0069282 A1 | 6/2002 | Reisman |
| 2002/0099948 A1 | 7/2002 | Kocher et al. |
| 2002/0127423 A1 | 9/2002 | Kayanakis |
| 2003/0097567 A1 | 5/2003 | Terao et al. |
| 2004/0052370 A1 | 3/2004 | Katznelson |
| 2004/0172552 A1 | 9/2004 | Boyles et al. |

FOREIGN PATENT DOCUMENTS

| | | |
|---|---|---|
| EP | 0 067 556 B1 | 12/1982 |
| EP | 0 084 441 | 7/1983 |
| EP | 0 180 460 | 5/1986 |
| EP | 0 257 585 A2 | 3/1988 |
| EP | 0 262 025 A2 | 3/1988 |
| EP | 0 332 304 A2 | 9/1989 |
| EP | 0 332 707 | 9/1989 |
| EP | 0 393 806 A2 | 10/1990 |
| EP | 0 450 841 A2 | 10/1991 |
| EP | 0 529 261 A2 | 3/1993 |
| EP | 0 613 073 A1 | 8/1994 |
| EP | 0 651 554 | 5/1995 |
| EP | 0 668 695 | 8/1995 |
| EP | 0 678 836 A1 | 10/1995 |
| EP | 0 679 977 A1 | 11/1995 |
| EP | 0 715 243 A1 | 6/1996 |
| EP | 0 715 244 A1 | 6/1996 |
| EP | 0 715 245 A1 | 6/1996 |
| EP | 0 725 376 | 8/1996 |
| EP | 0 731 404 A1 | 9/1996 |
| EP | 0 763 936 A2 | 3/1997 |
| EP | 0 818 748 A2 | 1/1998 |
| EP | 0 840 194 A2 | 5/1998 |
| EP | 0 892 521 A2 | 1/1999 |
| EP | 0 934 765 A1 | 8/1999 |
| EP | 0 946 022 A2 | 9/1999 |
| EP | 0 964 572 A1 | 12/1999 |
| EP | 1 103 922 | 5/2001 |
| GB | 1483282 | 8/1977 |
| GB | 2022969 A | 12/1979 |
| GB | 2 136 175 | 9/1984 |
| GB | 2 236 604 | 4/1991 |
| GB | 2236604 A | 4/1991 |
| GB | 2309364 A | 7/1997 |
| GB | 2316503 A | 2/1998 |
| GB | 2354102 A | 3/2001 |
| JP | 62-241061 | 10/1987 |
| JP | 64-068835 | 3/1989 |
| JP | 3-063717 A | 3/1991 |
| JP | 04-369068 | 12/1992 |
| JP | 5-100939 | 4/1993 |
| JP | 5168039 A2 | 7/1993 |
| JP | 05-268415 | 10/1993 |
| JP | 6-131371 A | 5/1994 |
| JP | 06-175794 | 6/1994 |
| JP | 06-215010 | 8/1994 |
| JP | 7-36768 | 2/1995 |
| JP | 07-084852 | 3/1995 |
| JP | 07-200317 | 8/1995 |
| JP | 07-244639 | 9/1995 |
| JP | 0 715 241 | 6/1996 |
| JP | 11031130 | 2/1999 |
| JP | 11032037 | 2/1999 |
| JP | 11205306 A2 | 7/1999 |
| JP | 11215121 A2 | 8/1999 |
| JP | 2000215165 A2 | 8/2000 |
| JP | 2005218143 A2 | 8/2005 |
| JP | 2005253109 A2 | 9/2005 |
| JP | 2006180562 A2 | 7/2006 |
| WO | WO 83/04461 A1 | 12/1983 |
| WO | WO 92/20022 | 11/1992 |
| WO | WO 92/20022 A1 | 11/1992 |
| WO | WO 93/01550 | 1/1993 |
| WO | WO 93/01550 A1 | 1/1993 |

| | | |
|---|---|---|
| WO | WO 93/11480 A1 | 6/1993 |
| WO | WO 94/01821 | 1/1994 |
| WO | WO 94/03003 A1 | 2/1994 |
| WO | WO 96/13814 A1 | 5/1996 |
| WO | WO 96/24092 | 8/1996 |
| WO | WO 96/24092 A2 | 8/1996 |
| WO | WO 96/27155 A2 | 9/1996 |
| WO | WO 97/25800 A1 | 7/1997 |
| WO | WO 97/37492 A1 | 10/1997 |
| WO | WO 97/41661 A2 | 11/1997 |
| WO | WO 97/43761 A2 | 11/1997 |
| WO | WO 97/48203 | 12/1997 |
| WO | WO 98/09209 A1 | 3/1998 |
| WO | WO 98/10561 A1 | 3/1998 |
| WO | WO 98/11690 | 3/1998 |
| WO | WO 98/11690 A1 | 3/1998 |
| WO | WO 98/19431 A1 | 5/1998 |
| WO | WO 98/42098 | 9/1998 |
| WO | WO 98/43426 A1 | 10/1998 |
| WO | WO 98/45768 A1 | 10/1998 |
| WO | WO 99/24928 A2 | 5/1999 |
| WO | WO 99/34553 A1 | 7/1999 |
| WO | WO 99/35782 A1 | 7/1999 |
| WO | WO 99/48296 A1 | 9/1999 |
| WO | WO 99/49615 | 9/1999 |
| WO | WO 99/60461 A1 | 11/1999 |
| WO | WO 99/60750 A2 | 11/1999 |
| WO | WO 00/04727 A2 | 1/2000 |
| WO | WO 00/05898 A2 | 2/2000 |
| WO | WO 00/20950 | 4/2000 |
| WO | WO 00/46994 A1 | 8/2000 |
| WO | WO 00/59152 A2 | 10/2000 |
| WO | WO 00/62260 A1 | 10/2000 |
| WO | WO 00/72118 A1 | 11/2000 |
| WO | WO 00/73922 A2 | 12/2000 |
| WO | WO 01/03044 A1 | 1/2001 |
| WO | WO 01/37209 A1 | 5/2001 |
| WO | WO 01/63528 | 8/2001 |
| WO | WO 2004/34223 A2 | 4/2004 |
| WO | WO 2004/103843 | 12/2004 |

OTHER PUBLICATIONS

"National Semiconductor and EPR Partner for Information Metering/Data Security Cards" Mar. 4, 1994, Press Release from Electronic Publishing Resources, Inc.
Weber, R., "Digital Rights Management Technology" Oct. 1995.
Flasche, U. et al., "Decentralized Processing of Documents", pp. 119-131, 1986, Comput. & Graphics, vol. 10, No. 2.
Mori, R. et al., "Superdistribution: The Concept and the Architecture", pp. 1133-1146, 1990, The Transactions of the IEICE, Vo. E 73, No. 7, Tokyo, JP.
Weber, R., "Metering Technologies for Digital Intellectual Property", pp. 1-29, Oct. 1994, A Report to the International Federation of Reproduction Rights Organizations.
Clark, P.C. et al., "Bits: A Smartcard protected Operating System", pp. 66-70 and 94, Nov. 1994, Communications of the ACM, vol. 37, No. 11.
Ross, P.E., "Data Guard", pp. 101, Jun. 6, 1994, Forbes.
Saigh, W.K., "Knowledge is Sacred", 1992, Video Pocket/Page Reader Systems, Ltd.
Kahn, R.E., "Deposit, Registration and Recordation in an Electronic Copyright Management System", pp. 1-19, Aug. 1992, Corporation for National Research Initiatives, Virginia.
Hilts, P. et al., "Books While U Wait", pp. 48-50, Jan. 3, 1994, Publishers Weekly.
Strattner, A, "Cash Register on a Chip may Revolutionaize Software Pricing and Distribution; Wave Systems Corp.", pp. 1-3, Apr. 1994, Computer Shopper, vol. 14, No. 4, ISSN 0886-0556.
O'Conner, M., "New Distribution Option for Electronic Publishers; iOpener Data Encryption and Metering System for CD-ROM use; Column", pp. 1-6, Mar. 1994, CD-ROM Professional, vol. 7, No. 2, ISSN: 1409-0833.

Willett, S., "Metered PCs: Is Your System Watching You? Wave System beta tests new technology", pp. 84, May 2, 1994, InfoWorld.
Linn, R., "Copyright and Information Services in the Context of the National Research and Education Network", pp. 9-20, Jan. 1994, IMA Intellectual Property Project Proceedings, vol. 1, Issue 1.
Perrit, Jr., H., "Permission Headers and Contract Law", pp. 27-48, Jan. 1994, IMA Intellectual Property Project Proceedings, vol. 1, Issue 1.
Upthegrove, L., "Intellectual Property Header Descriptors: A Dynamic Approach", pp. 63-66, Jan. 1994, IMA Intellectual Property Proceedings, vol. 1, Issue 1.
Sirbu, M., "Internet Billing Service Design and prototype Implementation", pp. 67-80, Jan. 1994, IMA Intellectual Property Project Proceedings, vol. 1, Issue 1.
Simmell, S. et al., "Metering and Licensing of Resources: Kala's General Purpose Approach", pp. 81-110, Jan. 1994, IMA Intellectual Property Project Proceedings, vol. 1, Issue 1.
Kahn, R., "Deposit, Registration and Recordation in an Electronic Copyright Management System", pp. 111-120, Jan. 1994, IMA Intellectual Property Project Proceedings, vol. 1, Issue 1.
Tygar, J. et al., "Dyad: A System for Using Physically Secure Coprocessors", pp. 121-152, Jan. 1994, IMA Intellectual Property Project Proceedings, vol. 1, Issue 1.
Griswold, G., "A Method for Protecting Copyright on Networks", pp. 169-178, Jan. 1994, IMA Intellectual Property Project Proceedings, vol. 1, Issue 1.
Nelson, T., "A Publishing and Royalty Model for Networked Documents", pp. 257-259, Jan. 1994, IMA Intellectual Property Project Proceedings, vol. 1, Issue 1.
Robinson, E., "Redefining Mobile Computing", pp. 238-240, 247-248 and 252, Jul. 1993, PC Computing.
Abadi, M. et al., "Authentication and Delegation with Smart-cards", pp. 1-24, 1990, Research Report DEC Systems Research Center.
Mark Stefik, "Letting Loose the Light: Igniting Commerce in Electronic Publication", pp. 219-253, 1996, Internet Dreams: Archetypes, Myths, and Metaphors, IDSN 0-262-19373-6.
Mark Stefik, "Letting Loose the Light: Igniting Commerce in Electronic Publication", pp. 2-35, Feb. 8, 1995, Internet Dreams: Archetypes, Myths and Metaphors.
Henry H. Perritt, Jr., "Technological Strategies for Protecting Intellectual Property in the Networked Multimedia Environment", Apr. 2-3, 1993, Knowbots, Permissions Headers & Contract Law.
Blaze et al, "Divertible Protocols and Atomic Proxy Cryptography" 1998 Advances in Cryptography—Euro Crypt International Conference on the Theory and Application of Crypto Techniques, Springer Verlag, DE.
Blaze et al, "Atomic Proxy Cryptography" Draft (Online) (Nov. 2, 1997) XP002239619 Retrieved from the Internet.
No Author, "Capability- and Object-Based Systems Concepts," Capability-Based Computer Systems, pp. 1-19 (no. date).
Cox, "Superdistribution" Wired Magazine (Sep. 1994) XP002233405 URL:http://www.wired.com/wired/archive/2.09/superdis_pr.html>.
Dunlop et al, Telecommunications Engineering, pp. 346-352 (1984).
Elgamal, "A Public Key Cryptosystem and a Signature Scheme Based on Discrete Logarithms," IEEE Transactions on Information Theory IT-31(4):469-472 (Jul. 1985).
Gheorghiu et al., "Authorization for Metacomputing Applications" (no date).
Iannella, ed., Open Digital Rights Language (ODRL), pp. 1-31 (Nov. 21, 2000).
Kahle, wais.concepts.txt, Wide Area Information Server Concepts, Thinking Machines Version 4, Draft, pp. 1-18 (Nov. 3, 1989).
Kahn, "Deposit, Registration and Recordation in an Electronic Copyright Management System," Technical Report, Corporation for National Research Initiatives, Reston, Virginia (Aug. 1992) URL:http://www.cni.org/docs/ima.ip-workshop/kahn.html.
Kahn et al, "The Digital Library Project, vol. 1: The World of Knowbots (DRAFT), An Open Architecture for a Digital Library System and a Plan for its Development," Corporation for National Research Initiatives, pp. 1-48 (Mar. 1988).
Kohl et al, Network Working Group Request for Comments: 1510, pp. 1-112 (Sep. 1993).

Lee et al, CDMA Systems Engineering Handbook (1998) [excerpts but not all pages numbered].

Mambo et al, "Protection of Data and Delegated Keys in Digital Distribution," Information Security and Privacy. Second Australian Conference, ACISP '97 Proceedings, pp. 271-282 (Sydney, NSW, Australia, Jul. 7-9, 1997, 1997 Berlin, Germany, Springer-Verlag, Germany), XP008016393 ISBN: 3-540-63232-8.

Mambo et al, "Proxy Cryptosystems: Delegation of the Power to Decrypt Ciphertexts,", IEICE Trans. Fundamentals vol. E80-A, No. 1:54-63 (Jan. 1997) ) XP00742245 ISSN: 0916-8508.

Microsoft Word, Users Guide, Version 6.0, pp. 487-489, 549-555, 560-564, 572-575, 599-613, 616-631 (1993).

Ojanperä and Prasad, eds., Wideband CDMA for Third Generation Mobile Communications (1998) [excerpts but not all pages numbered].

Perritt, "Knowbots, Permissions Headers and Contract Law," Paper for the Conference on Technological Strategies for Protecting Intellectual Property in the Networked Multimedia Environment, pp. 1-22 (Apr. 2-3, 1993 with revisions of Apr. 30, 1993).

Raggett, (Hewlett Packard), "HTML+(Hypertext markup language)," pp. 1-31 (Jul. 12, 1993) URL:http://citeseer.ist.psu.edu/correct/340709.

Samuelson et al, "Intellectual Property Rights for Digital Library and Hypertext Publishing Systems: An Analysis of Xanadu," Hypertext '91 Proceedings, pp. 39-50 (Dec. 1991).

No Author, "Softlock Services Introduces . . . Softlock Services" Press Release (Jan. 28, 1994).

No Author, "Appendix III—Compatibility with HTML," No Title, pp. 30-31 (no date).

No Editor, No Title, Dictionary pages, pp. 469-472, 593-594 (no date).

Benoit, Digital Television MPEG-1, MPEG-2 and Principles of the DVB System, pp. 75-80, 116-121 (no date).

Benoit, Digital Television MPEG-1, MPEG-2 and Principles of the DVB System, $2^{nd}$ edition, pp. 74-80 (no date).

AH Digital Audio and Video Series, "DTV Receivers and Measurements," Understanding Digital Terrestrial Broadcasting, pp. 159-164 (no date).

O'Driscoll, The Essential Guide to Digital Set-Top Boxes and Interactive TV, pp. 6-24 (no date).

Ius Mentis, "The ElGamal Public Key System," pp. 1-2 (Oct. 1, 2005) online at http://www.iusmentis.com/technology/encyrption/elgamal.

Schneier, "Crypto Bibliography," Index of Crypto Papers Available Online, pp. 1-2 (online) (no date).

No Author, No Title, pp. 344-355 (no date).

No Author, "Part Four Networks," No Title, pp. 639-714 (no date).

Microsoft Word User's Guide, pp. 773-774, 315-316, 487-489, 561-564, 744, 624-633 (1993).

No Author, "What is the ElGamal Cryptosystem," p. 1 (Nov. 27, 2006) online at http://www.x5.net/faqs/crypto/q29.html.

Johnson et al., "A Secure Distributed Capability Based System," ACM, pp. 392-402 (1985).

Wikipedia, "El Gamal Encyption," pp. 1-3 (last modified Nov. 2, 2006) online at http://en.wikipedia.org/wiki/E1Gamal_encryption.

Blaze, "Atomic Proxy Cryptography," p. 1 Abstract (Oct. 20, 1998).

Blaze, "Matt Blaze's Technical Papers," pp. 1-6 (last updated Aug. 6, 2006)].

Online Search Results for "inverted file", "inverted index" from www.techweb.com, www.cryer.co.uk, computing-dictionary.thefreedictionary.com, www.nist.gov, en.wikipedia.org, www.cni.org, www.tiscali.co.uk (Jul. 15-16, 2006).

Corporation for National Research Initiatives, "Digital Object Architecture Project", http://www.nnri.reston.va.us/doa.html (updated Nov. 28, 2006).

Stefik, Summary and Analysis of A13 (Kahn, Robert E and Vinton G Cerf, "The Digital Library Project, vol. 1: The World of Knowbots (DRAFT), An Open Architecture for a Digital Library System and a Plan for its Development," Corporation for National Research Initiatives (Mar. 1988)), pp. 1-25 (May 30, 2007).

Bill Rosenblatt, et al., ContentGuard White Pages; "Integrating Content Management with Digital Rights Management—Imperatives and Opportunities for Digital Content Lifecycles" GiantSteps Media Technology Strategies; May 15, 2005; pp. 1-20; www.contentguard.com/whitepapers/CM-DRMwhitepaper.pdf.

M. Kamat; Texas A&M University; "Security Requirements for Digital Rights Management"; In The Proceedings of ISECON 2002, v 19 (San Antonio): §353b. ISSN: 1542-7382; pp. 1-4; http://isedj.org/isecon/2002/353b/ISECON.2002.kamat.ppt.

International Search Report; mailed Mar. 2, 2005 (International Application No. PCT/US04/32588).

Johnson et al., "A Secure Distributed Capability Based System," Proceedings of the 1985 ACM Annual Conference on the Range of Computing: Mid-80's Perspective: MID-80's Perspective *Association for Computing Machinery* pp. 392-402 (1985).

Delaigle, "Digital Watermarking," Spie Conference in Optical Security and Counterfeit Deterrence Techniques, San Jose, CA (Feb. 1996).

Perritt, "Technologies Strategies for Protecting Intellectual Property in the Networked Multimedia Environment," Knowbots, Permissions Headers and Contract Law (Apr. 2-3, 1993).

* cited by examiner

Label 40

Offer 44

Offer 44

Offer 44

US 7,774,280 B2

SYSTEM AND METHOD FOR MANAGING TRANSFER OF RIGHTS USING SHARED STATE VARIABLES

RELATED APPLICATION DATA

This application is a continuation-in-part application of co-pending application Ser. No. 10/162,701 filed on Jun. 6, 2002, which claims benefit from U.S. provisional applications Ser. Nos. 60/331,624, 60/331,623, and 60/331,621 filed on Nov. 20, 2001, and U.S. provisional applications Ser. Nos. 60/296,113, 60/296,117, and 60/296,118 filed on Jun. 7, 2001, the entire disclosures of all of which are hereby incorporated by reference herein.

FIELD OF THE INVENTION

The present invention generally relates to rights transfer and more particularly to a method, system and device for managing transfer of rights using shared state variables.

BACKGROUND OF THE INVENTION

One of the most important issues impeding the widespread distribution of digital works (i.e. documents or other content in forms readable by computers), via electronic means, and the Internet in particular, is the current lack of ability to enforce the intellectual property rights of content owners during the distribution and use of digital works. Efforts to resolve this problem have been termed "Intellectual Property Rights Management" ("IPRM"), "Digital Property Rights Management" ("DPRM"), "Intellectual Property Management" ("IPM"), "Rights Management" ("RM"), and "Electronic Copyright Management" ("ECM"), collectively referred to as "Digital Rights Management (DRM)" herein. There are a number of issues to be considered in effecting a DRM System. For example, authentication, authorization, accounting, payment and financial clearing, rights specification, rights verification, rights enforcement, and document protection issues should be addressed. U.S. Pat. Nos. 5,530,235, 5,634,012, 5,715,403, 5,638,443, and 5,629,980, the disclosures of which are incorporated herein by reference, disclose DRM systems addressing these issues.

Two basic DRM schemes have been employed, secure containers and trusted systems. A "secure container" (or simply an encrypted document) offers a way to keep document contents encrypted until a set of authorization conditions are met and some copyright terms are honored (e.g., payment for use). After the various conditions and terms are verified with the document provider, the document is released to the user in clear form. Commercial products such as CRYPTOLOPES™ and DIGIBOXES™ fall into this category. Clearly, the secure container approach provides a solution to protecting the document during delivery over insecure channels, but does not provide any mechanism to prevent legitimate users from obtaining the clear document and then using and redistributing it in violation of content owners' intellectual property.

In the "trusted system" approach, the entire system is responsible for preventing unauthorized use and distribution of the document. Building a trusted system usually entails introducing new hardware such as a secure processor, secure storage and secure rendering devices. This also requires that all software applications that run on trusted systems be certified to be trusted. While building tamper-proof trusted systems is a real challenge to existing technologies, current market trends suggest that open and untrusted systems, such as PC's and workstations using browsers to access the Web, will be the dominant systems used to access digital works. In this sense, existing computing environments such as PC's and workstations equipped with popular operating systems (e.g., Windows™, Linux™, and UNIX) and rendering applications, such as browsers, are not trusted systems and cannot be made trusted without significantly altering their architectures. Of course, alteration of the architecture defeats a primary purpose of the Web, i.e. flexibility and compatibility.

As an example, U.S. Pat. No. 5,634,012, the disclosure of which is incorporated herein by reference, discloses a system for controlling the distribution of digital documents. Each rendering device has a repository associated therewith. A predetermined set of usage transaction steps define a protocol used by the repositories for enforcing usage rights. Usage rights define one or more manners of use of the associated document content and persist with the document content. The usage rights can permit various manners of use such as, viewing only, use once, distribution, and the like. Usage rights can be contingent on payment or other conditions. Further, a party may grant usage rights to others that are a subset of usage rights possessed by the party.

DRM systems have facilitated distribution of digital content by permitting the content owner to control use of the content. However, known business models for creating, distributing, and using digital content and other items involve a plurality of parties. For example, a content creator may sell content to a publisher who then authorizes a distributor to distribute content to an on-line storefront who then sells content to end-users. Further, the end users may desire to share or further distribute the content. In such a business model, usage rights can be given to each party in accordance with their role in the distribution chain. However, the parties do not have control over downstream parties unless they are privy to any transaction with the downstream parties in some way. For example, once the publisher noted above provides content to the distributor, the publisher cannot readily control rights granted to downstream parties, such as the first or subsequent users unless the publisher remains a party to the downstream transaction. This loss of control combined with the ever increasing complexity of distribution chains results in a situation, which hinders the distribution of digital content and other items. Further, the publisher may want to prohibit the distributor and/or the storefront from viewing or printing content while allowing an end user receiving a license from the storefront to view and print. Accordingly, the concept of simply granting rights to others that are a subset of possessed rights is not adequate for multi-party, i.e. multi-tier, distribution models.

SUMMARY OF THE INVENTION

The exemplary embodiments of the present invention are directed to a method, system and device for transferring rights adapted to be associated with items from a rights supplier to a rights consumer, including obtaining a set of rights associated with an item, the set of rights including meta-rights specifying derivable rights that can be derived from the meta-; determining whether the rights consumer is entitled to the derivable rights specified by the meta-rights; and deriving at least one right from the derivable rights, if the rights consumer is entitled to the derivable rights specified by the meta-rights, wherein the derived right includes at least one state variable based on the set of rights and used for determining a state of the derived right.

Still other aspects, features, and advantages of the present invention are readily apparent from the following detailed description, simply by illustrating a number of exemplary embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

Exemplary embodiments of this invention will be described in detail, with reference to the attached drawings in which.

DETAILED DESCRIPTION

Figure 1:
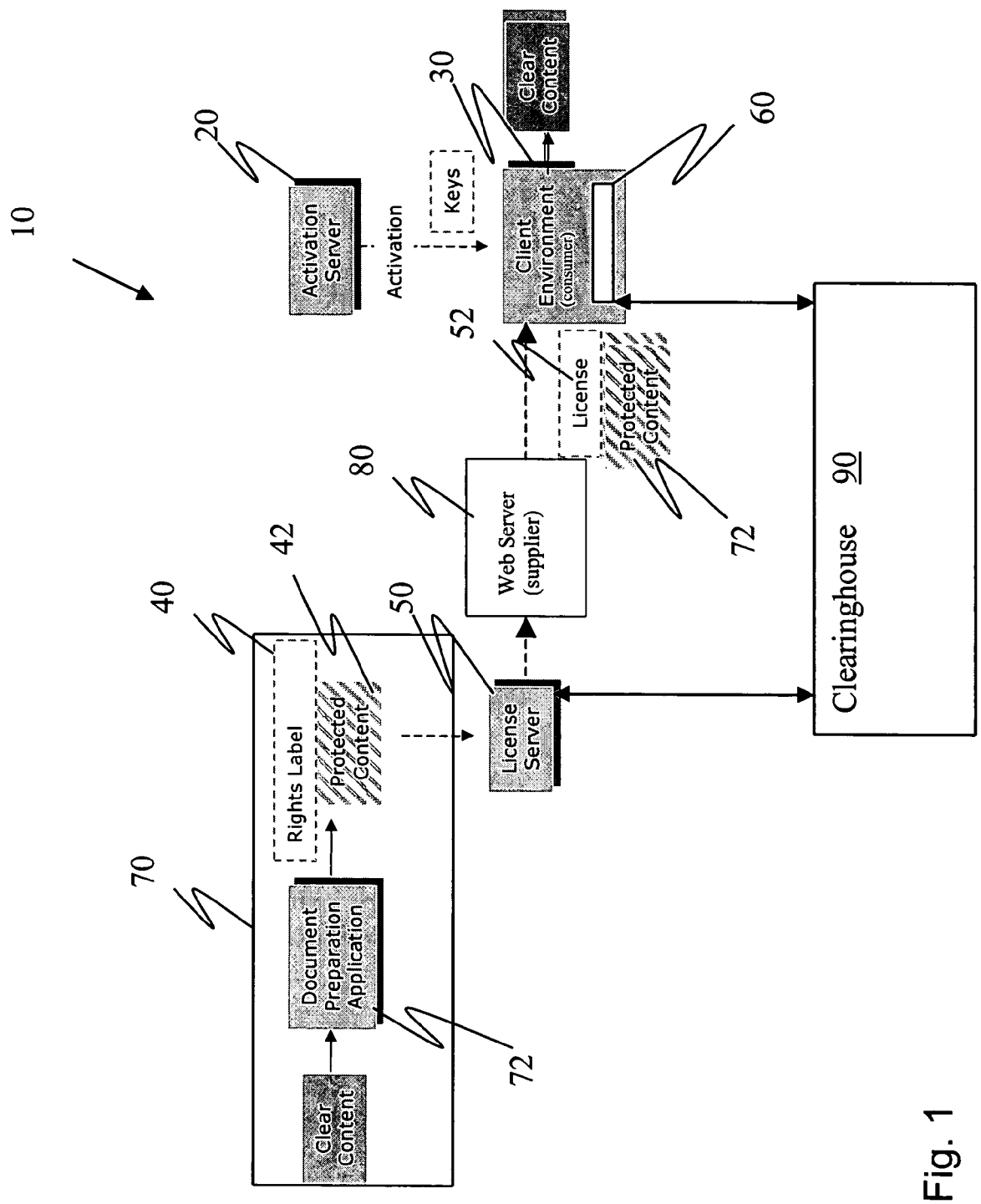
FIG. 1 is a schematic illustration of a rights management system in accordance with the preferred embodiment.

A DRM system can be utilized to specify and enforce usage rights for specific content, services, or other items. FIG. 1 illustrates DRM System 10 that can be used in connection with the preferred embodiment. DRM System 10 includes a user activation component, in the form of activation server 20, that issues public and private key pairs to content users in a protected fashion, as is well known. During an activation process, some information is exchanged between activation server 20 and client environment 30, a computer or other device associated with a content recipient, and client component 60 is downloaded and installed in client environment 30. Client component 60 preferably is tamper resistant and contains the set of public and private keys issued by activation server 20 as well as other components, such as any component necessary for rendering content 42.

Rights label 40 is associated with content 42 and specifies usage rights and possibly corresponding conditions that can be selected by a content recipient. License Server 50 manages the encryption keys and issues licenses for protected content. These licenses embody the actual granting of usage rights to an end user. For example, rights label 40 may include usage rights permitting a recipient to view content for a fee of five dollars and view and print content for a fee of ten dollars. License 52 can be issued for the view right when the five dollar fee has been paid, for example. Client component 60 interprets and enforces the rights that have been specified in license 52.

Figure 6:
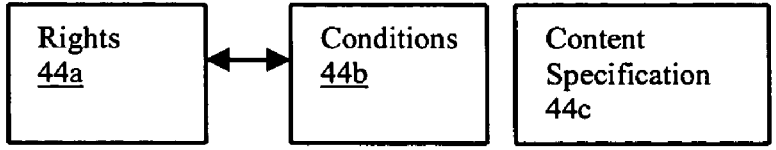
FIG. 6 is a block diagram of a rights label in accordance with the preferred embodiment.
Figure 6:
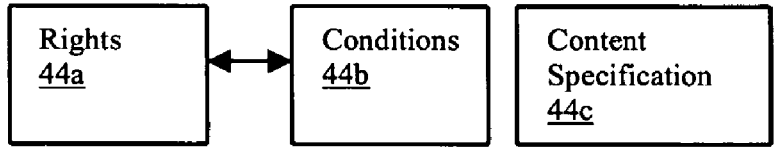
Figure 6:
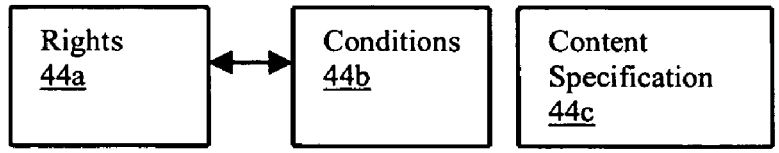

FIG. 6 illustrates rights label 40 in accordance with the preferred embodiment. Rights label 40 includes plural rights offers 44 each including usage rights 44a, conditions 44b, and content specification 44c. Content specification 44c can include any mechanism for calling, referencing, locating, linking or otherwise specifying content 42 associated with offer 44. Clear (unprotected) content can be prepared with document preparation application 72 installed on computer 70 associated with a content publisher, a content distributor, a content service provider, or any other party. Preparation of content consists of specifying the rights and conditions under which content 42 can be used, associating rights label 40 with content 42 and protecting content 42 with some crypto algorithm. A rights language such as XrML can be used to specify the rights and conditions. However, the rights can be specified in any manner. Also, the rights can be in the form of a pre-defined specification or template that is merely associated with the content. Accordingly, the process of specifying rights refers to any process for associating rights with content. Rights label 40 associated with content 42 and the encryption key used to encrypt the content can be transmitted to license server 50. As discussed in detail below, rights 44a can include usage rights, which specify a manner of use, and meta-rights, which permit other rights to be derived.

In some case, license 52 includes conditions that must be satisfied in order to exercise a specified right. For, example a condition may be the payment of a fee, submission of personal data, or any other requirement desired before permitting exercise of a manner of use. Conditions can also be "access conditions" for example, access conditions can apply to a particular group of users, say students in a university, or members of a book club. In other words, the condition is that the user is a particular person or member of a particular group. Rights and conditions can exist as separate entities or can be combined.

Labels, offers, usage rights, and conditions can be stored together with content 42 or otherwise associated with content 42 through content specification 44c or any other mechanism. A rights language such as XrML can be used to specify the rights and conditions. However, the rights can be specified in any manner. Also, the rights can be in the form of a pre-defined specification or template that is merely associated with content 42.

A typical workflow for DRM system 10 is described below. A recipient operating within client environment 30 is activated for receiving content 42 by activation server 20. This results in a public-private key pair (and possibly some user/machine specific information) being downloaded to client environment 30 in the form of client software component 60 in a known manner. This activation process can be accomplished at any time prior to the issuing of a license.

When a recipient wishes to obtain specific content 42, the recipient makes a request for content 42. For example, a user, as a recipient, might browse a Web site running on Web server 80, using a browser installed in client environment 30, and request content 42. During this process, the user may go through a series of steps possibly including a fee transaction (as in the sale of content) or other transactions (such as collection of information). When the appropriate conditions and other prerequisites, such as the collection of a fee and verification that the user has been activated, are satisfied, Web server 80 contacts license server 50 through a secure communications channel, such as a channel using a Secure Sockets Layer (SSL). License server 50 then generates license 52 for content 42 and Web server 80 causes both the content and license 52 to be downloaded. License 52 includes the appropriate rights, such as usage rights and/or meta-rights, and can be downloaded from license server 50 or an associated device. Content 42 can be downloaded from computer 70 associated with a vendor, distributor, or other party.

Client component 60 in client environment 30 will then proceed to interpret license 52 and allow use of content 42 based on the usage rights and conditions specified in license 52. The interpretation and enforcement of usage rights are well known generally and described in the patents referenced above, for example. The steps described above may take place sequentially or approximately simultaneously or in various orders.

DRM system 10 addresses security aspects of content 42. In particular, DRM system 10 may authenticate license 52 that has been issued by license server 50. One way to accomplish such authentication is for application 60 to determine if license 52 can be trusted. In other words, application 60 has the capability to verify and validate the cryptographic signature, or other identifying characteristic of license 52. Of course, the example above is merely one way to effect a DRM system. For example, license 52 and content 42 can be distributed from different entities. Clearinghouse 90 can be used to process payment transactions and verify payment prior to issuing a license.

As noted above, typical business models for distributing digital content include plural parties, such as owners, publishers, distributors, and users. Each of these parties can act as a supplier granting rights to a consumer downstream in the distribution channel. The preferred embodiment extends the known concepts of usage rights, such as the usage rights and related systems disclosed in U.S. Pat. Nos. 5,629,980, 5,634,012, 5,638,443, 5,715,403 and 5,630,235, to incorporate the concept of "meta-rights." Meta-rights are the rights that one has to generate, manipulate, modify, dispose of or otherwise derive other rights. Meta-rights can be thought of as usage rights to usage rights (or other meta-rights). This concept will become clear based on the description below.

Meta-rights can include derivable rights to offer rights, grant rights, negotiate rights, obtain rights, transfer rights, delegate rights, expose rights, archive rights, compile rights, track rights, surrender rights, exchange rights, and revoke rights to/from others. Meta-rights can include the rights to modify any of the conditions associated with other rights. For example, a meta-right may be the right to extend or reduce the scope of a particular right. A meta-right may also be the right to extend or reduce the validation period of a right. Meta-rights can be hierarchical and can be structured as objects within objects. For example, a distributor may have a meta-right permitting the distributor to grant a meta-right to a retailer which permits the retailer to grant users rights to view content. Just as rights can have conditions, meta-rights can also have conditions. Meta-rights can also be associated with other meta-rights.

The concept of meta-rights can be particularly useful because distribution models may include entities that are not creators or owners of digital content, but are in the business of manipulating the rights associated with the content. For example, as noted above, in a multi-tier content distribution model, intermediate entities (e.g., distributors) typically will not create or use the content but will be given the right to issue rights for the content they distribute. In other words, the distributor or reseller will need to obtain rights (meta-rights) to issue rights. For the sake of clarity, the party granting usage rights or meta-rights is referred to as "supplier" and the party receiving and/or exercising such rights is referred to as "consumer" herein. It will become clear that any party can be a supplier or a consumer depending on their relationship with the adjacent party in the distribution chain. Note that a consumer "consumes", i.e. exercises, rights and does not necessarily consume, i.e. use, the associated content.

Figure 2:
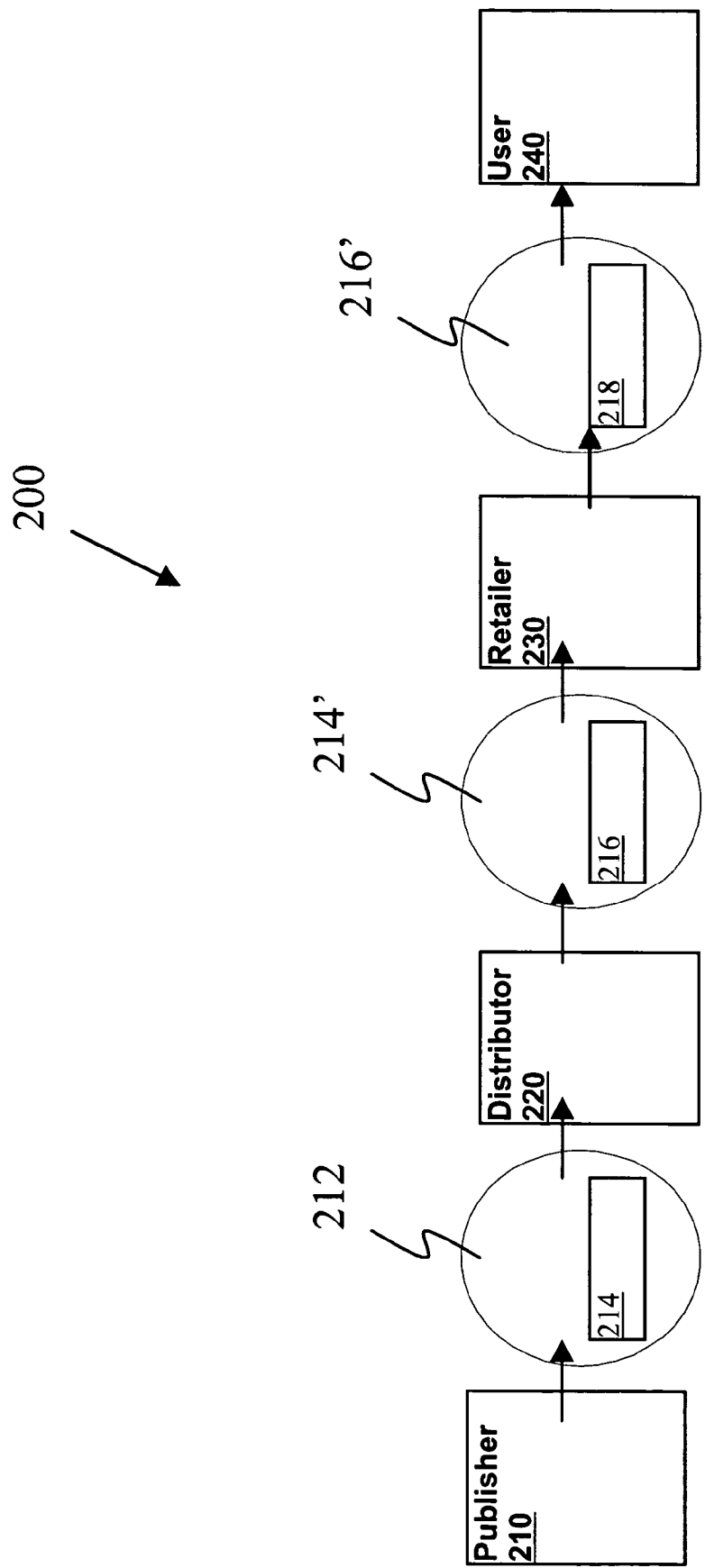
FIG. 2 is a block diagram of an example distribution chain showing the derivation of rights from meta-rights.

FIG. 2 schematically illustrates an example of a multi-tier distribution model 200. Publisher 210 publishes content for distribution, by distributor 220 for example. Distributor 220 distributes content to retailers, such as retailer 230 and retailer 230 sells content to users, such as user 240. In model 200, publisher 210 could negotiate business relationships with distributor 220 and distributor 220 could negotiate business relationships with retailer 230. Also, retailer 230 may desire usage rights that are beyond usage rights granted to distributor 220. However, keep in mind that, in a distribution chain that utilizes a DRM system to control use and distribution of content or other items, content can travel from publisher 210 to user 240 through any digital communication channel, such a network or transfer of physical media. When user 240 wishes to use content, a license is obtained, in the manner described above for example. Accordingly, the negotiated relationships can become difficult, if not impossible, to manage.

In model 200 of FIG. 2, retailer 230 will only grant rights to user 240 that have been predetermined and authorized by the distributor 220, publisher 210 and potentially other parties upstream of the transaction, such as the content creator or owner. The rights are predetermined through, and derived from, meta-rights granted to retailer 230 by distributor 220. Of course, there can be any number of parties in the distribution chain. For example, distributor 220 may sell directly to the public in which case retailer 230 is not necessary. Also, there may be additional parties. For example user 240 can distribute to other users.

In model 200 publisher grants to distributor 220 usage rights 212 permitting distribution of content, and meta-rights 214. Meta-rights 214 permit distributor 220 to grant to retailer 230 the usage right 214' (derived from meta-rights 214) to distribute or possibly sell content and meta-rights 216 which permit retailer 230 to grant user 240 the right to use content. For example, publisher 210 may specify, through meta-rights 214, that meta-right 216 granted to retailer 230 permits retailer 230 to grant only 500 licenses and usage rights 216' that retailer 230 can grant to a user can only be "view" and "print-once". In other words, distributor 220 has granted meta-rights to retailer 230. Similarly, publisher 210 issues meta-rights 214 to the distributor that will govern what type, and how many, rights distributor 220 can grant to retailer 230. Note that these entities could be divisions, units or persons that are part of a larger enterprise, which also has other roles. For example, an enterprise might create, distribute, and sell content and carry out those activities using different personnel or different business units within the enterprise. The principles of meta-rights can be applied to an enterprise to determine content usage within that enterprise. Also, retailer 230 could grant meta-rights 218 to user 240 permitting user 240 to share rights or grant usage rights to achieve a super-distribution model. It can be seen that meta-rights of a party are derived from meta-rights granted by an upstream party in the distribution chain.

For example, a person's medical records can be in digital form managed by a first hospital as publisher 230. In this scenario, the person, as supplier, grants usage rights to the hospital, as consumer, to access and update the medical records. Should that person require treatment at a second hospital and desires to transfer their records to the second hospital, the person can grant to the first hospital the right to transfer the access rights to the new hospital through meta-rights. In other words, the person has specified meta-rights and granted the meta-rights to the first hospital. The meta-rights permit the first hospital to grant rights, as a supplier, to the second hospital, as a consumer. In another example, a person's last will and testament can be in digital form and managed by a law firm as publisher 210. If the person wishes to allow a third party to review the will. The person can grant meta-rights to the law firm permitting the law firm to grant access rights to this third party.

At a high level the process of enforcing and exercising meta-rights are the same as for usage rights. However, the difference between usage rights and meta-rights are the result from exercising the rights. When exercising usage rights, actions to content result. For example usage rights can be for viewing, printing, or copying digital content. When meta-rights are exercised, new rights are created from the meta-rights or existing rights are disposed as the result of exercising the meta-rights. The recipient of the new rights may be the same principal (same person, entity, or machine, etc), who exercises the meta-rights. Alternatively, the recipient of meta-rights can be a new principal. The principals who receive the derived rights may be authenticated and authorized before receiving/storing the derived rights. Thus, the mechanism for exercising and enforcing a meta-right can be the same as that for a usage right. For example, the mechanism disclosed in U.S. Pat. No. 5,634,012 can be used.

Figure 3:
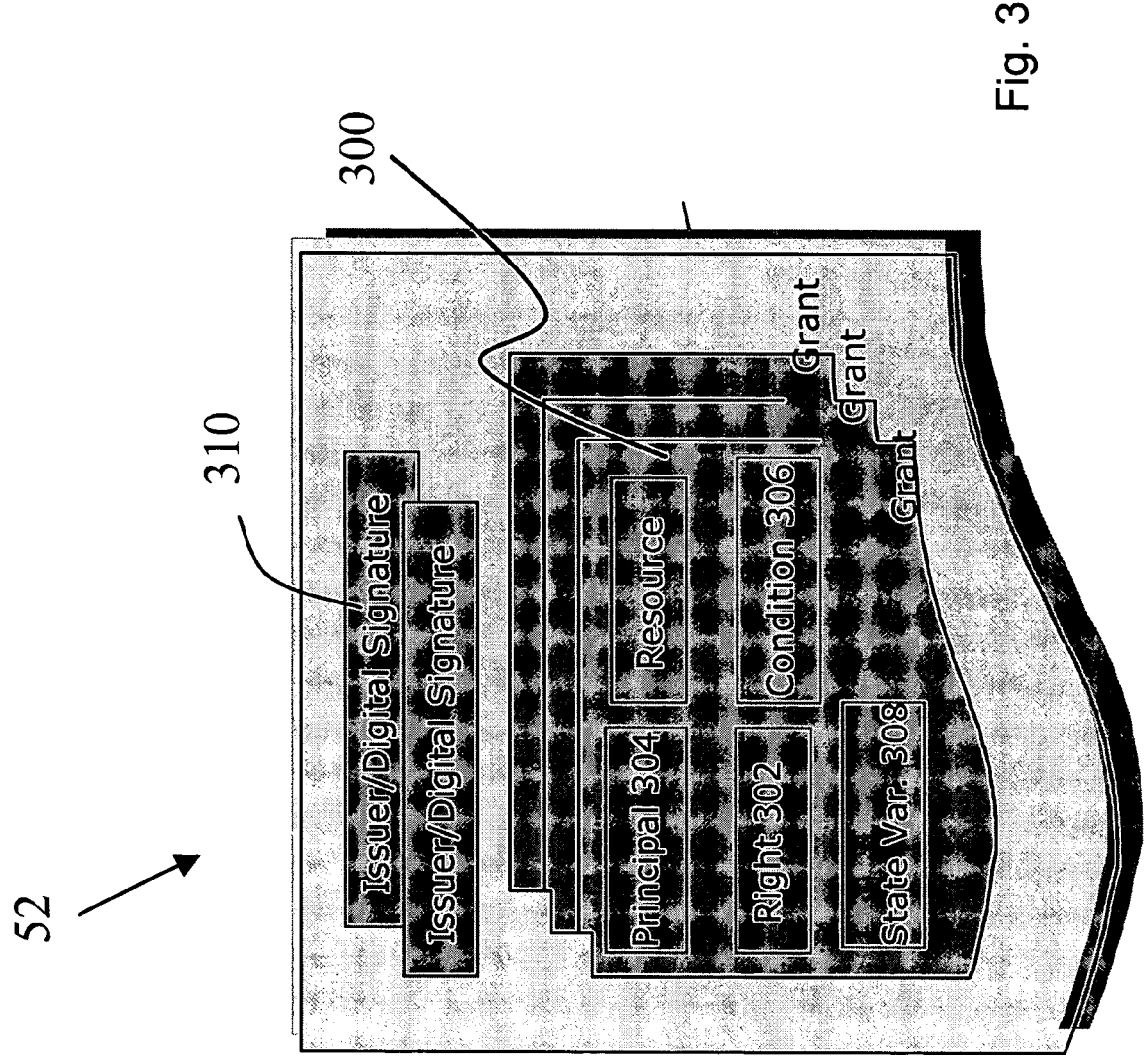
FIG. 3 is a schematic illustration of a license in accordance with the preferred embodiment.

Meta-rights can be expressed by use of a grammar or rights language including data structures, symbols, elements, or sets of rules. For example, the XrML™ rights language can be used. As illustrated in FIG. 3, the structure of license 52 can consist of one or more grants 300 and one or more digital signatures 310. Each grant 300 includes specific granted meta-rights 302 such as rights to offer usage rights, grant usage rights, obtain usage rights, transfer usage rights, exchange usage rights, transport usage rights, surrender usage rights, revoke usage rights, reuse usage rights, or management meta-rights such as the rights to backup rights, restore rights, recover rights, reissue rights, or escrow the rights for management of meta-rights and the like.

Grant 300 can also specify one or more principals 304 to whom the specified meta-rights are granted. Also grants 300 can include conditions 306 and state variables 308. Like usage rights, access and exercise of the granted meta-rights are controlled by any related conditions 306 and state variables 308. The integrity of license 52 is ensured by the use of digital signature 310, or another identification mechanism. Signature 310 can include a crypto-algorithm, a key, or another mechanism for providing access to content 42 in a known manner. The structure of digital signature 310 includes the signature itself, the method of how the code is computed, the key information needed to verify the code and issuer identification.

State variables track potentially dynamic states conditions. State variables are variables having values that represent status of rights, or other dynamic conditions. State variables can be tracked, by clearinghouse 90 or another device, based on identification mechanisms in license 52. Further, the value of state variables can be used in a condition. For example, a usage right can be the right to print content 42 for and a condition can be that the usage right can be exercised three times. Each time the usage right is exercised, the value of the state variable is incremented. In this example, when the value of the state variable is three, the condition is no longer satisfied and content 42 cannot be printed. Another example of a state variable is time. A condition of license 52 may require that content 42 is printed within thirty days. A state variable can be used to track the expiration of thirty days. Further, the state of a right can be tracked as a collection of state variables. The collection of the change is the state of a usage right represents the usage history of that right.

Figure 4:
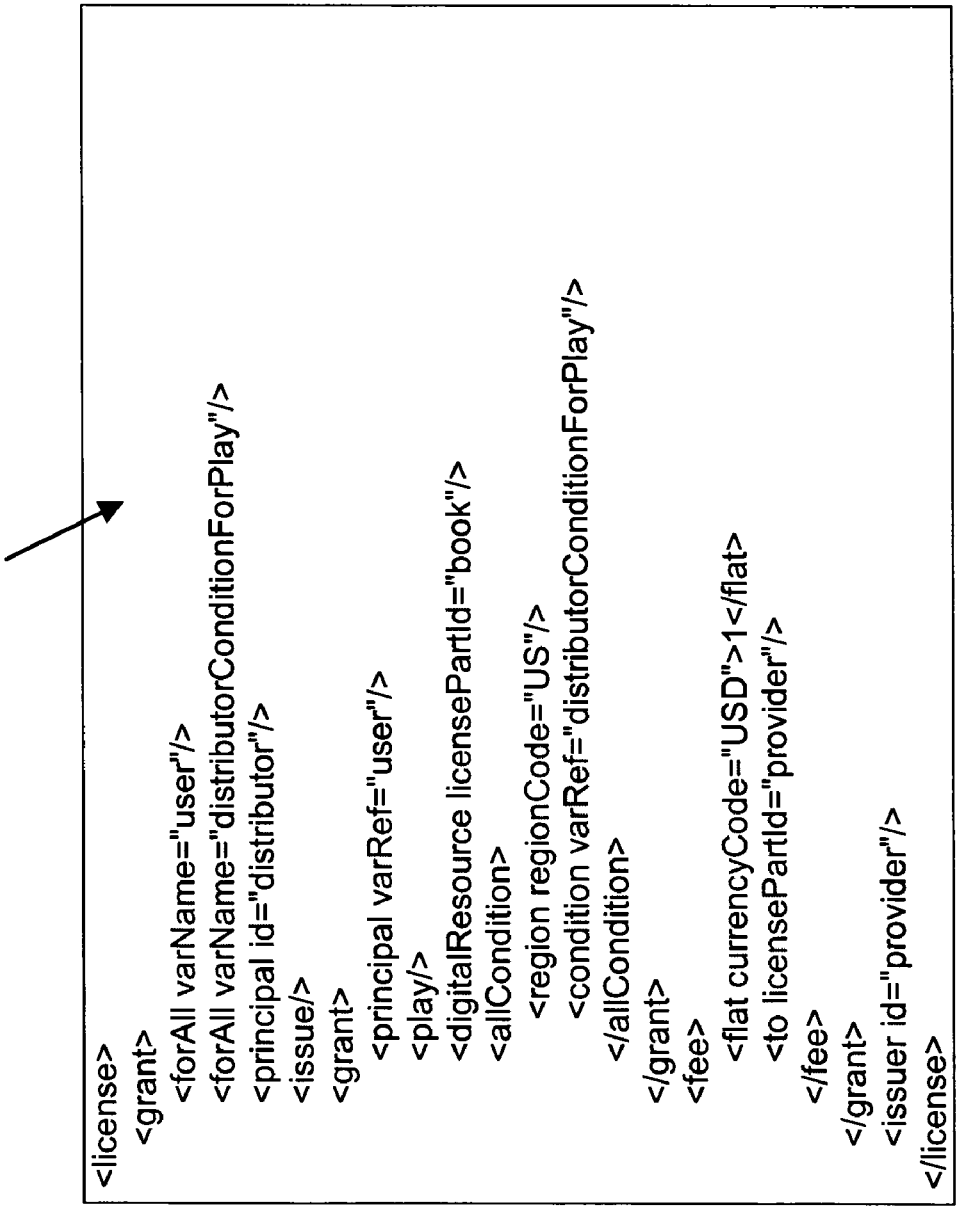
FIG. 4 is an example of a license expressed with an XML based rights language in accordance with the preferred embodiment.

FIG. 4 is an example of license 52 encoded in XrML™. The provider grants the distributor a meta right to issue a usage right (i.e., play) to the content (i.e., a book) to any end user. With this meta right, the distributor may issue the right to play the book within the U.S. region and subject to some additional conditions that the distributor may impose upon the user, as long as the distributor pays $1 to the provider each time the distributor issues a license for an end user. The XrML™ specification is published and thus well known.

Figure 5:
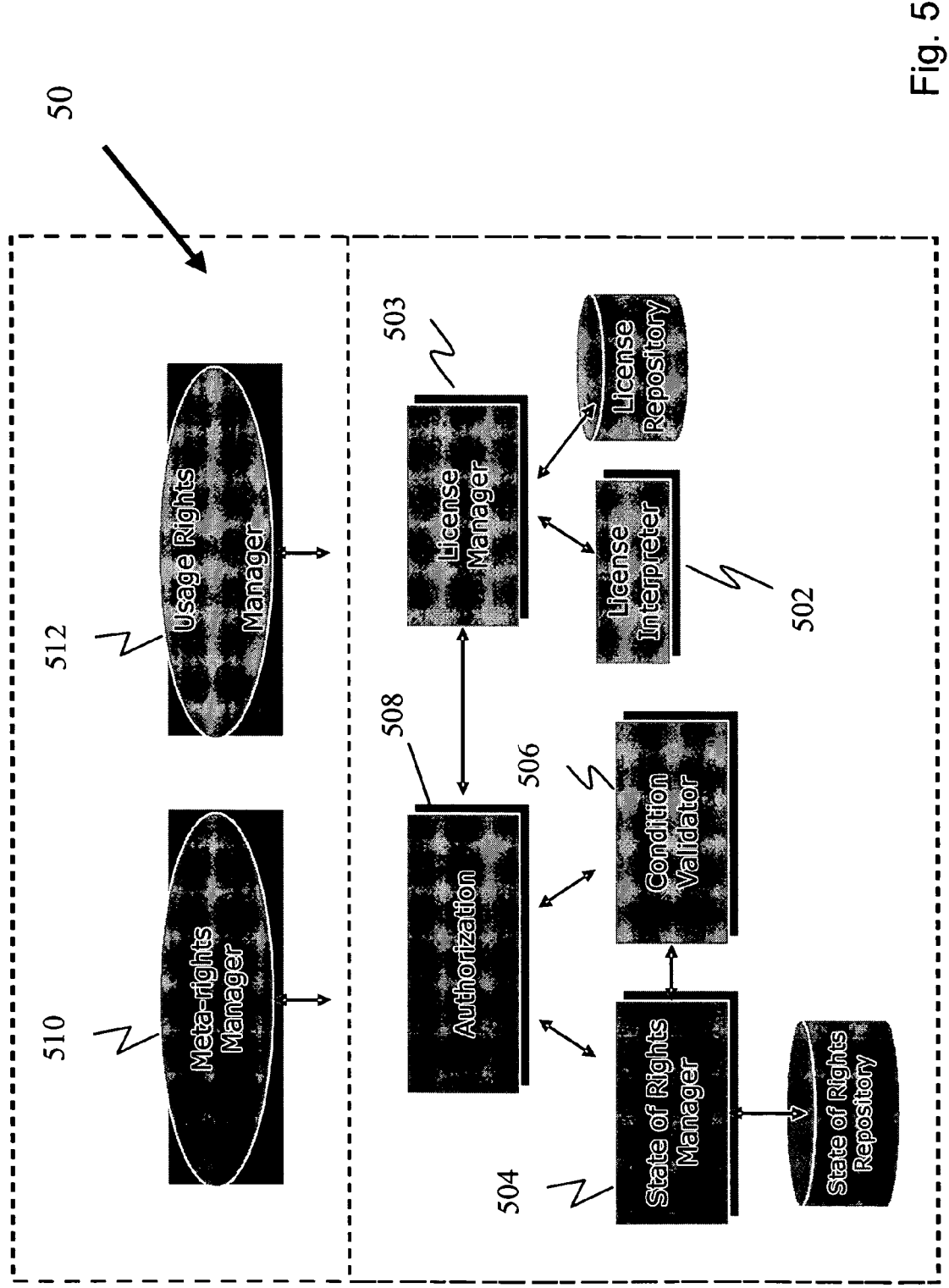
FIG. 5 is a block diagram of the license server of the system of FIG. 1.

FIG. 5 illustrates the primary modules of license server 50 in accordance with the preferred embodiment. License interpreter module 502 validates and interprets license 52 and also provides the functions to query any or all fields in the license such as meta-rights 302, conditions 306, state variables 308, principle 304, and/or digital signature 310. License manager module 503 manages all license repositories for storing licenses 52, and also provides functions to create licenses 52 for derived rights, verify licenses, store licenses, retrieve licenses and transfer licenses. State of rights module 504 manages the state and history of rights and meta-rights. The current value and history of the state variables together with the conditions controls the permission to exercise given meta-rights for a given authenticated principal. Condition validator 506 verifies conditions associated with the meta-rights. Together with the state variables, conditions associated with meta-rights define variables whose values may change over the lifetime of the meta-rights. Values of state variables used in conditions can affect the meta-rights at the time and during the time the rights are exercised.

Authorization module 508 authorizes the request to exercise meta-rights and to store the newly created rights or derived rights as the result of exercising the meta-rights. Authorization module 508 accesses both state of rights manager module 504 and condition validator module 506. Authorization module 508 interacts with license manager module 503 and the list of state variables and conditions and then passes the state variables to state of rights manager module 504 and condition list to condition validator module 506 for authorization.

A request for exercising a meta-right is passed to meta-rights manager module 510. Assuming that the requesting device has been authenticated, meta-rights manager module 510 requests the license manager module 504 to verify the license for exercising the requested meta-rights. License manager module 504 verifies the digital signature of the license and the key of the signer. If the key of the signer is trusted and the digital signature is verified then license manager module 504 returns "verified" to the meta-rights manager module 510. Otherwise "not verified" is returned.

Authorization module 508 instructs license manager 503 to fetch state variable 308 and conditions 306 of license 52.

Authorization manager 508 then determines which state variables are required to enforce to enforce license 52. State of rights manager 504 then supplies the current value of each required state variable to authorization module 508. Authorization module 508 then passes conditions 306 and the required state variables to condition validator 506. If all conditions 306 are satisfied, authorization module 508 returns "authorized" to meta-rights manager module 510.

Meta-rights manager module 510 verifies license 52 and meta-rights 302 therein, to authorize the request to exercise meta-rights 302, to derive new rights from meta-rights 302, and to update the state of rights and the current value of the conditions. Rights manager module 512, on the other hand, manages the new rights created or the derived rights as the result of exercising the meta-rights. Rights manager module 512 uses authorization module 508 to verify that recipient of the newly created rights or derived rights is intended principal 304. If the recipient are authorized then the rights manager module 512 directs license manager 504 to store the newly created rights in a repository associated with the consumer. This is discussed in greater detail below with reference to FIG. 7.

The authorization process is not limited to the sequence or steps described above. For example, a system could be programmed to allow authorization module 508 to request the state conditions from license manager 504 prior to verification of the digital signature. In such a case it would be possible to proceed subject to a verified license. Further, the various modules need not reside in the license server or related devices. The modules can be effected through hardware and/or software in any part of the system and can be combined or segregated in any manner.

Once a request to exercise a meta-rights has been authorized, the meta-right can be exercised. Meta-rights manager module 510 informs state of rights module 504 that it has started exercising the requested meta-rights. State of rights module 504 then records the usage history and changes its current value of the state variables. Meta-rights manager module 510 exercises the requested meta-rights in a manner similar to known procedures for usage rights. If new rights are derived, then meta-rights manager module 510 invokes license manager module 504 to create new rights as the result of exercising the target meta-rights. Each new right is then sent to the corresponding rights manager module 512 of the consumer and stored in a repository associated with the consumer. Rights manager module 512 of the consumer will authenticate and authorize the consumer before receiving and storing the newly created right. New rights can be derived from meta-rights in accordance with a set of rules or other logic. For example, one rule can dictate that a consumed right to offer a license for use will result in the consumer having the right to offer a usage right and grant a license to that usage right to another consumer.

Figure 7:
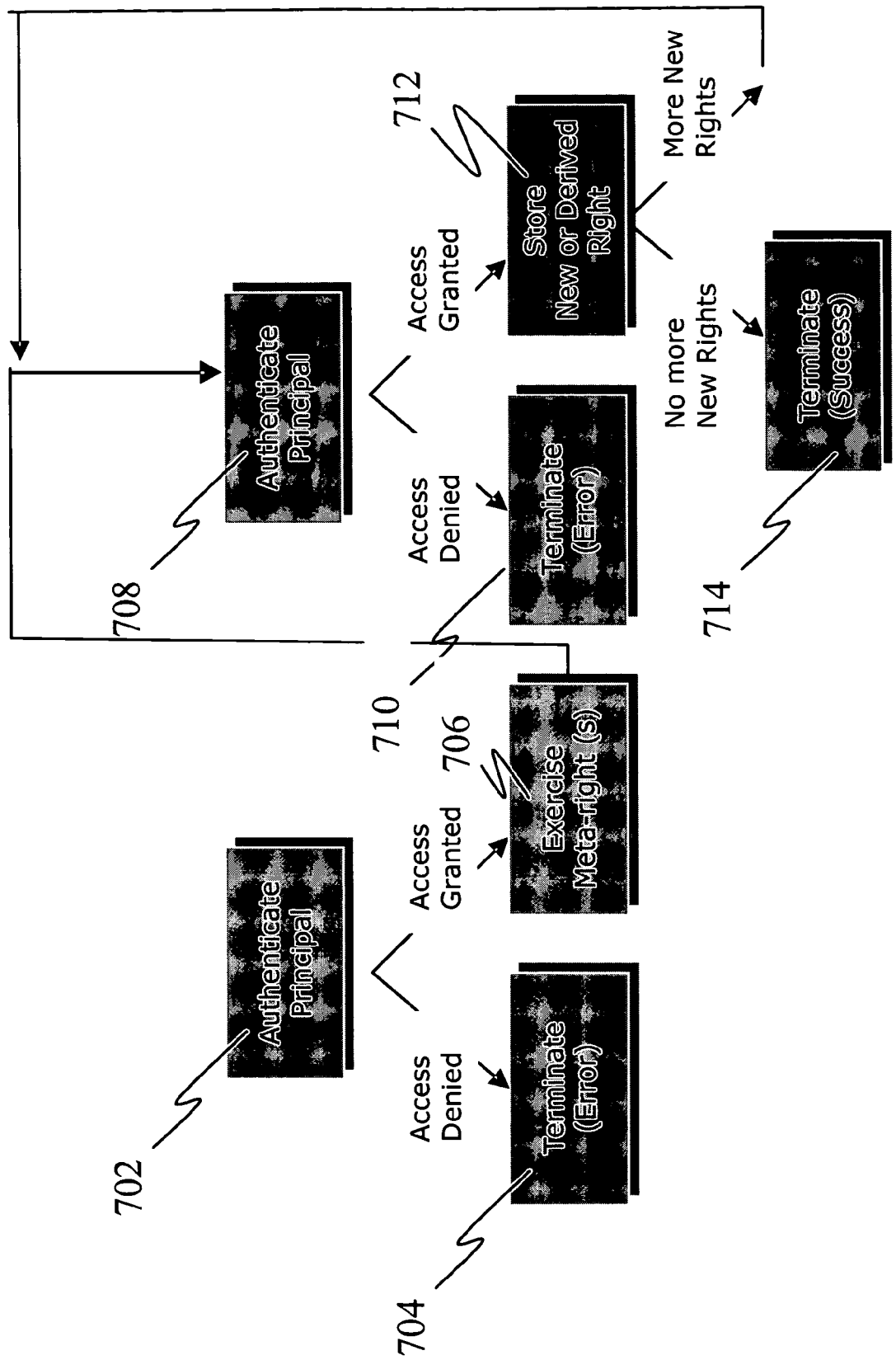
FIG. 7 is a flow chart of the procedure for transferring and deriving rights in accordance with the preferred embodiment.

FIG. 7 illustrates the workflow for transferring meta-rights and deriving new rights from the meta-rights in accordance with the preferred embodiment. All steps on the left side of FIG. 7 relate to the supplier of rights and all steps on the right side of FIG. 7 relate to the consumer of rights. In step 702, principal 304 of license 52 is authenticated in a known manner. In other words, it is determined if the party exercising meta-right 302 has the appropriate license to do so. If the principal is not authorized, the procedure terminates in step 704. If the principal is authorized, the procedures advances to step 706 in which meta right 302 is exercised and transmitted to the consumer in the form of license 52 having derived rights in the manner set forth above. In step 708 the principal of this new license is authenticated. In other words, it is determined if the party exercising the derived rights has the appropriate license to do so. If the principal is not authorized, the procedure terminates in step 710. If the principal is authorized, the procedures advances to step 712 in which the derived right is stored. The procedure then returns to step 708 for each additional right in the license and terminates in step 714 when all rights have been processed.

Thus, the exemplary embodiments include a method for transferring rights adapted to be associated with items from a rights supplier to a rights consumer, including obtaining a set of rights associated with an item, the set of rights including meta-rights specifying derivable rights that can be derived therefrom by the rights consumer, determining whether the rights consumer is entitled to derive the derivable rights specified by the meta-rights, and at least one of deriving the derivable rights, and generating a license including the derived rights with the rights consumer designated as a principal if the rights consumer is entitled to derive the derivable rights specified by the meta-rights. The exemplary embodiments further include a license associated with an item and adapted to be used within a system for managing the transfer of rights to the item from a rights supplier to a rights consumer. The license includes a set of rights including meta-rights specifying derivable rights that can be derived therefrom by the rights consumer, a principal designating at least one rights consumer who is authorized to derive the derivable rights, and a mechanism for providing access to the item in accordance with the set of rights. The exemplary embodiments still further include a method for deriving rights adapted to be associated with items from meta-rights, including obtaining a set of rights associated with an item, the set of rights including meta-rights specifying derivable rights that can be derived therefrom by the rights consumer, and generating a license associated with the item and including the derived rights.

Figure 8:
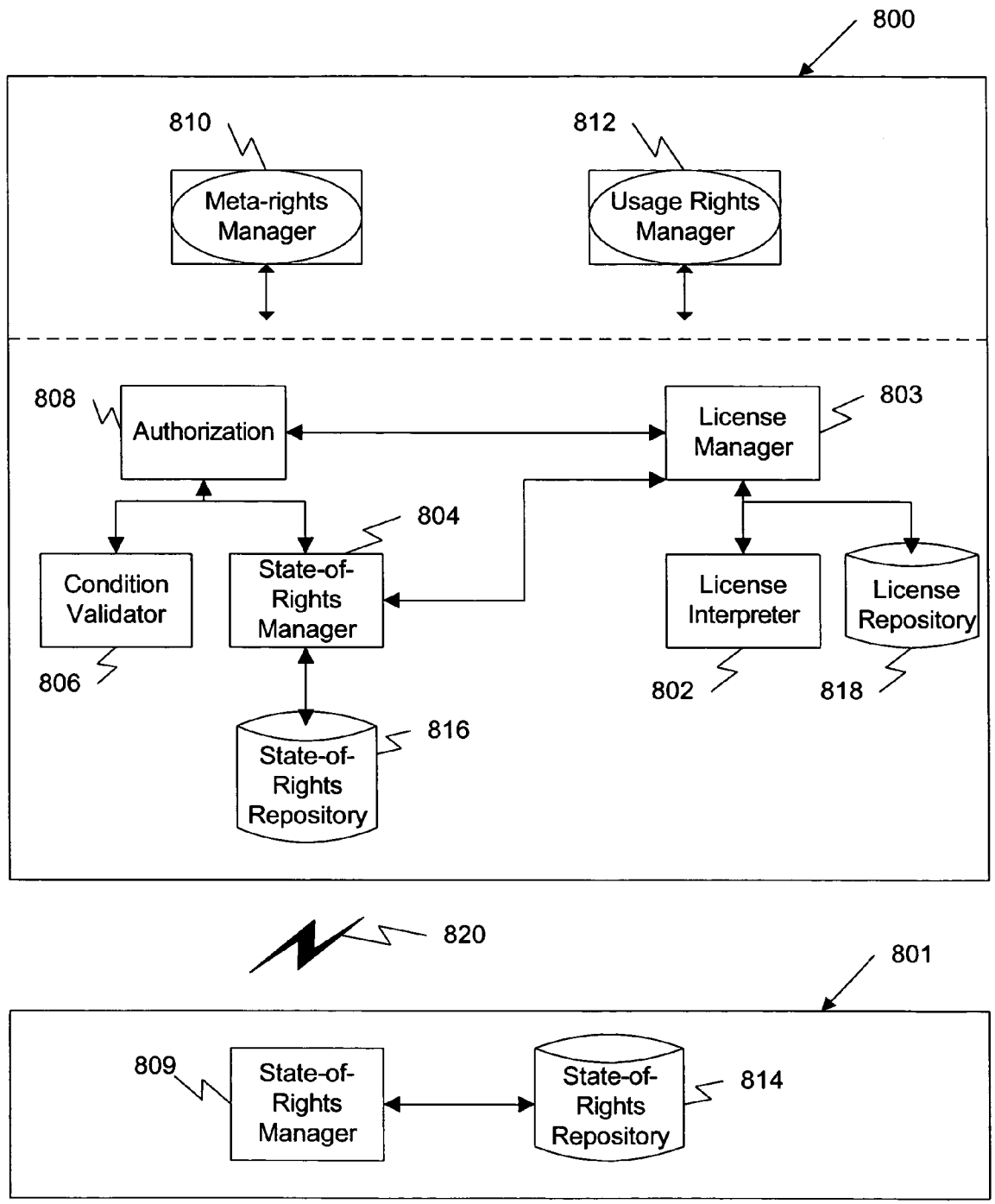
FIG. 8 illustrates an exemplary system including a state-of-rights server.

FIG. 8 illustrates an exemplary system including a common state-of-rights server, according to the present invention. In FIG. 8, the exemplary system can include a common state-of-rights server of the system 801, including a state-of-rights manager 809, and one or more state-of-rights repositories 814, and one or more license servers 800, including a meta-rights manager 810, a usage rights manager 812, an authorization component 808, a condition validator 806, a state-of-rights manager 804, one or more state-of-rights repositories 816, a license manager 803, a license interpreter 802, and one or more license repositories 818.

The common state-of-rights server 801 can be configured as a remote server connected with one or more of the license servers 800. The common state-of-rights server 801 provides comparable services as the state-of-rights manager 804 in the license servers 800 via the state-of-rights manager 809. The services provided by the state-of-rights server 801 are accessible and states that the server 801 manages can be shared by one or more rights suppliers and rights consumers (not shown).

The state-of-rights server 801 can be configured as a remote server connected with one or more of the license servers 800 via one or more communication links 820, and the like. The services provided by the state-of-rights server 801 also can be integrated within one or more of the license server 800 and such services can be accessible by other rights suppliers, rights consumers, and the like.

The license manager 803 derives new rights based on an offer, which can include any suitable machine-readable expression, and optionally including meta-rights. While deriving rights, the license manager 803 can create new state variables to be associated with derived rights. The creation of state variables and their scopes can be prescribed in the offer or by some other function in the system. The state variables can be created in one or more instances, for example, prior to rights derivation, during rights derivation, upon fulfillment of conditions, during a first exercise of rights associated with the state variables, and the like. The state variables can be designated exclusively for a specific rights consumer, can be shared among rights consumers, and can be shared among rights consumers and other entities, such as rights suppliers, and the like. The license manager 803 can interact with the state-of-rights manager 804 to associate new state variables with physical addresses in one or more of the state-of-rights repositories 816. The state-of-rights manager 804 can access the one or more state-of-rights repositories 816 and can interact with the state-of-rights server 801 to access shared state variables from one or more of the state-of-rights repositories 814.

Designated state variables can be used to support a license that grants a recipient of the license a right to print content 5 times, shared state variables can be used to support a site license that grants a group of authorized users a right to print content an aggregated total of 100 times, and the like. A designated state variable can be updated when the corresponding right is exercised, whereas a shared state variable can be updated when an authorized user exercises the corresponding right. In other words, a shared state variable can include a data variable that is updated in response to actions by a plurality of users and which is globally applied to each of the users.

There are multiple ways to specify the scope of state variables, each of which can affect whether the derivative state variables can be shared, how the derivative state variables can be shared, and the like. For example, a state variable can be local, and solely confined to a recipient or can be global, and shared by a predetermined group of recipients. A global state variable can be shared by a group of recipients not determined when derived rights are issued, but to be specified later, perhaps based on certain rules defined in the license or based on other means. A global state variable can be shared between one or more rights suppliers, predetermined recipients, unspecified recipients, and the like. Advantageously, depending on the sharing employed with a given a business model and the rights granted in the meta-rights, state variables can be created at different stages of the value chain.

A set of non-exhaustive exemplary usages of state variables will now be described. For example, a state variable can be unspecified in meta-rights, which means the identifier and value of the state variable are yet to be determined by the meta-rights manager module 810 and included in the derived right. If a distinct state variable is assigned to each derived right, the scope of the state variable in the derived right is typically exclusive to the recipient.

Figure 9:
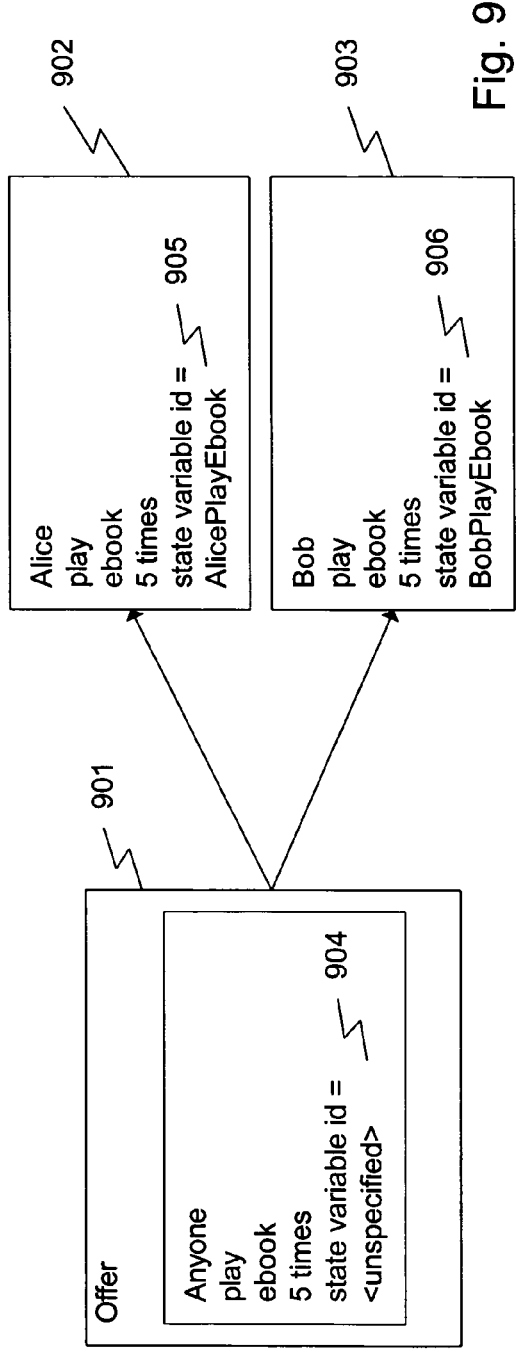
FIG. 9 illustrates employing of a state variable in deriving exclusive usage rights.

FIG. 9 is used to illustrate employing of a state variable in deriving exclusive usage rights, according to the present invention. In FIG. 9, rights 902 and 903 derived from an offer 901 are exclusive to each respective consumer. The offer 901 is a type of meta-right of which the recipients have the rights to obtain specific derivative rights when the conditions for obtaining such rights are satisfied. Accordingly, the exemplary offer 901 has an unspecified state variable 904. However, specific state variable 905 and 906, each with uniquely assigned identifications (IDs) are included in the derived rights 902 and 903. The derived state variables 905 and 906 are bound to their associated derived rights, e.g., "AlicePlayEbook" (i.e., Alice has the right to play Ebook) is bound to derived right 902, and "BobPlayEbook" (i.e., Bob has the right to play Ebook) is bound to derived right 903 The "AlicePlayEbook" variable can be updated when Alice exercises her play right, whereas the "BobPlayEbook" variable can be updated when Bob exercises his play right.

Other than deriving rights from an offer, a right can transfer from an entity to a recipient. When a right is transferred, the governing of the associated state variable is also transferred to the recipient. After a right is transferred, the source principal typically can no longer exercise the right, whereas the recipient can exercise the right. The license server governing the exercising of a right of a recipient assumes the responsibility for state management. If, however, the state variables are managed by the common state of right server 801, the state of right server 801 needs to be informed of the transfer of right. Specifically, the state variable can be managed in the context of the recipient after the transfer of right.

When a right is to be shared between the source principal and the recipient, the associated state variable is referenced in the derived right. If the same right is shared with multiple recipients, then typically all of the recipients share the same state variables with the source principal. In this case, a shared state can be managed by an entity that is accessible by all sharing principals.

Figure 10:
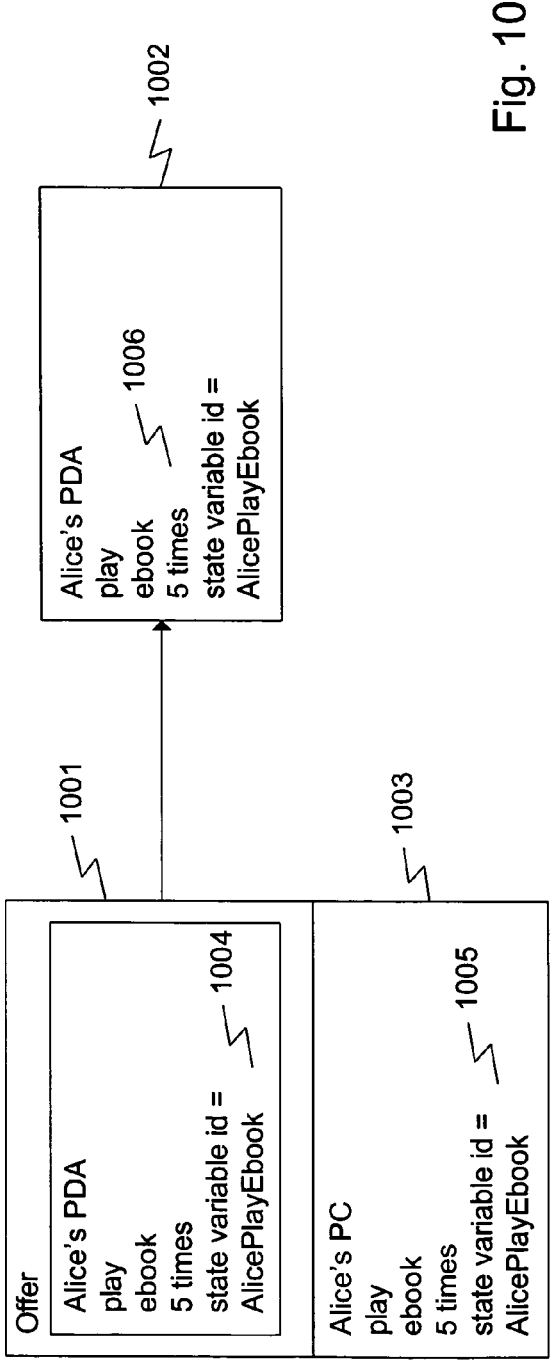
FIG. 10 illustrates employing of a state variable in deriving inherited usage rights.

FIG. 10 is used to illustrate employing of a state variable in deriving inherited usage rights, according to the present invention. In FIG. 10, a derived right can inherit a state variable from meta-rights. For example, a personal computer (PC) of a user, Alice, can be configured to play an e-book according to a license 1003. A personal data assistant (PDA) of Alice also can obtain a right to play the e-book according to offer 1001, if the PC and PDA share the same state variables 1004 and 1005, e.g., "AlicePlayEbook." A derived right 1002 allows Alice also to play the e-book on her PDA as long as the PDA and the PC share a same count limit 1006 of 5 times.

When a usage right is to be shared among a predetermined set of recipients, a state variable for tracking a corresponding usage right can be specified in a meta-right using a same state variable identification for all recipients. During a process of exercising the meta-right, the same state variable identification is included in every derived right.

Figure 11:
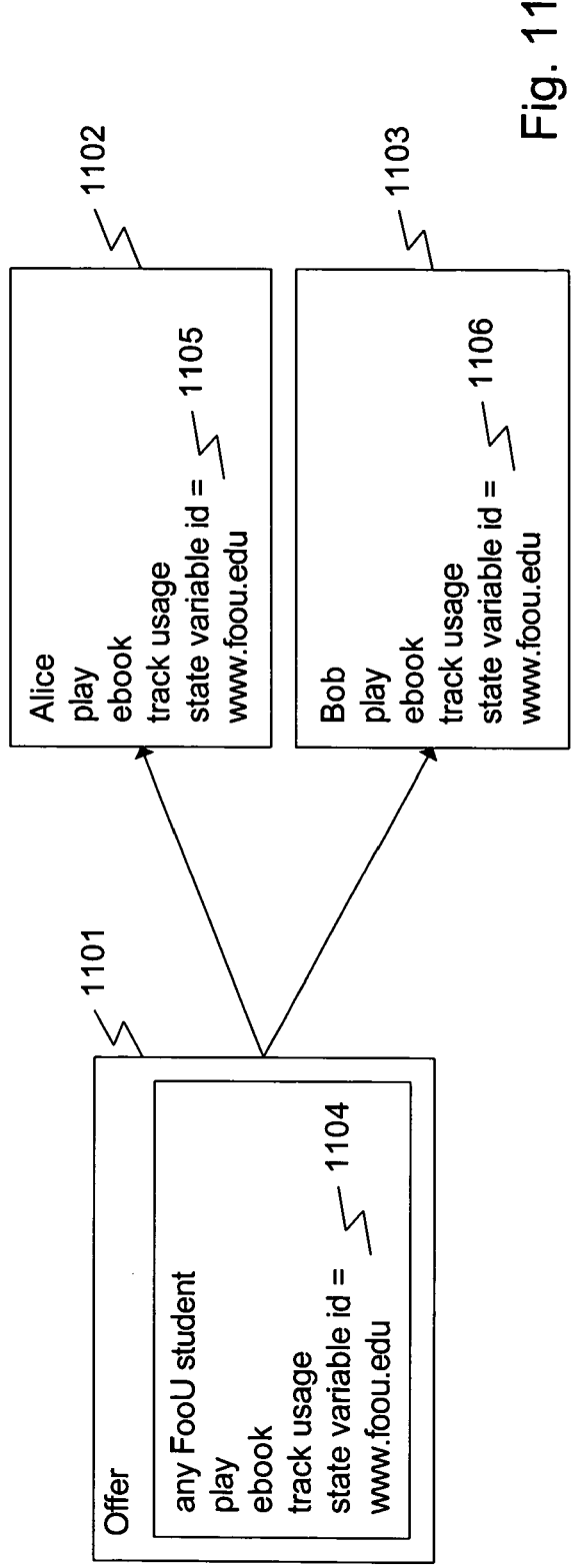
FIG. 11 illustrates employing of a state variable in deriving rights that are shared among a known set of rights recipients.

FIG. 11 illustrates the use of state variable in deriving rights that are shared among a known set of rights recipients, according to the present invention. In FIG. 11, a site license 1101 is issued to FooU university. For example, via the site license 1101, a librarian is granted a right to issue rights that allow FooU students to play, view, and the like, corresponding content, such as e-books and the like, as long as such usage is tracked by a state variable 1104, e.g., "www.foou.edu." Accordingly, rights 1102 and 1103 derived from the site license 1101 include state variables 1105 and 1106, "www.foou.edu," which can be updated when corresponding students, Alice and Bob, play the e-book.

When a usage right is to be shared among a dynamic set of recipients, the state variable can stay unspecified in the usage right. When exercising a meta-right and a set of recipients is known, a state variable can be specified using some identification unique to the known recipients and can be included within a derived right.

Figure 12:
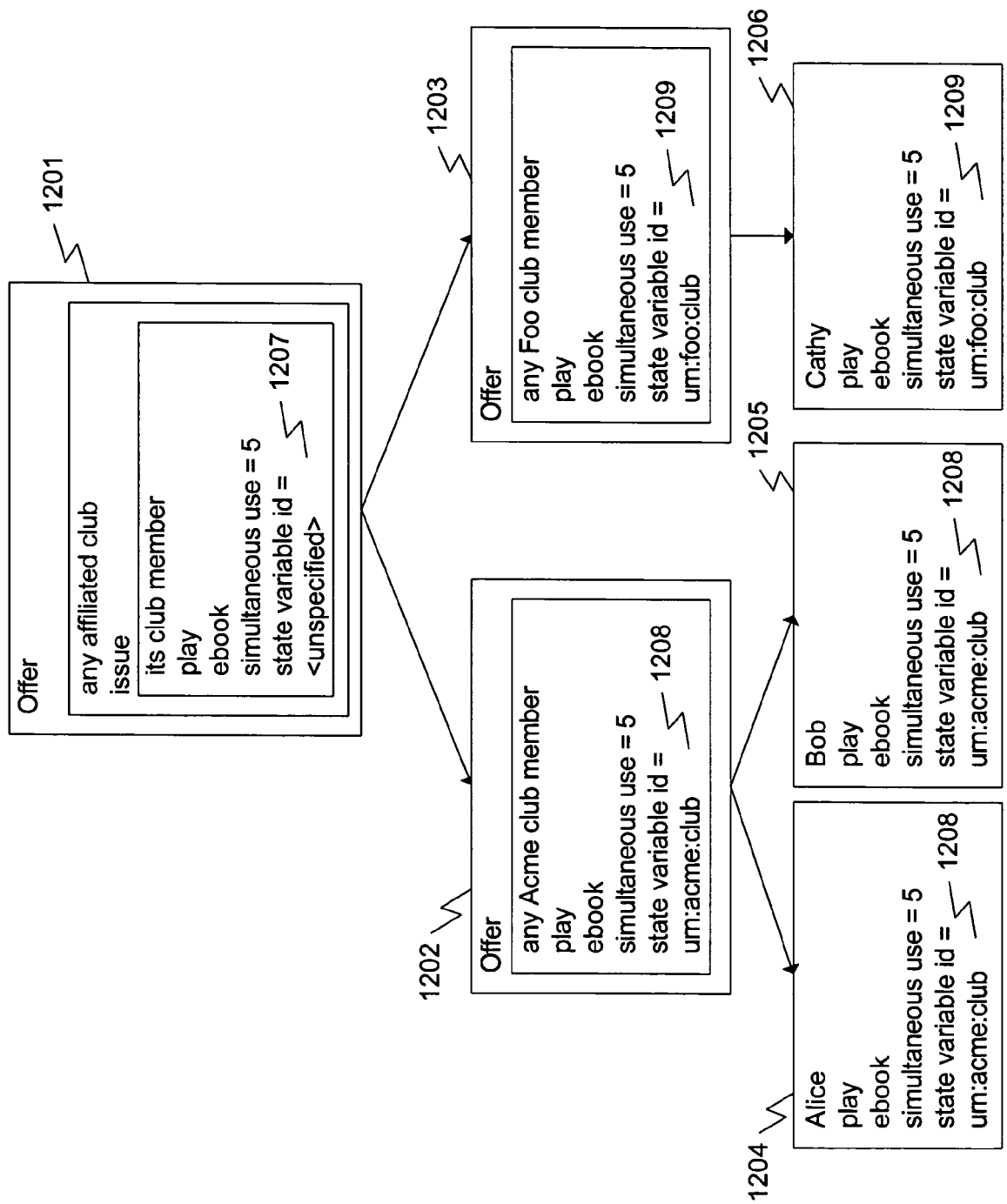
FIG. 12 illustrates employing of a state variable in deriving rights that are shared among a dynamic set of rights recipients.

FIG. 12 is used to illustrate employing of a state variable in deriving rights that are shared among a dynamic set of rights recipients, according to the present invention. In FIG. 12, an offer 1201 specifies that a distributor can issue site licenses to affiliated clubs, allowing 5 members of each club to concurrently view, play, and the like, content, such as an e-book. A corresponding state variable 1207 associated with such a right can be unspecified in the offer 1201. When corresponding rights 1202 and 1203 are issued to affiliated clubs, the corresponding club identities are used to specify state variables 1208 and 1209 in the issued rights. The offers 1202 and 1203 are meta-rights derived from the offer 1201, with offer being assigned the distinct state variables 1208 and 1209. Further rights 1204-1206 can be derived from the offers 1202 and 1203 to be shared among members of each respective club. The licenses 1204 and 1205 are examples of rights derived from the offer 1202, and which inherit the state variable 1208, e.g., "urn:acme:club," whereas the license 1206 inherits the state variable 1209, e.g., "urn:foo:club."

Figure 13:
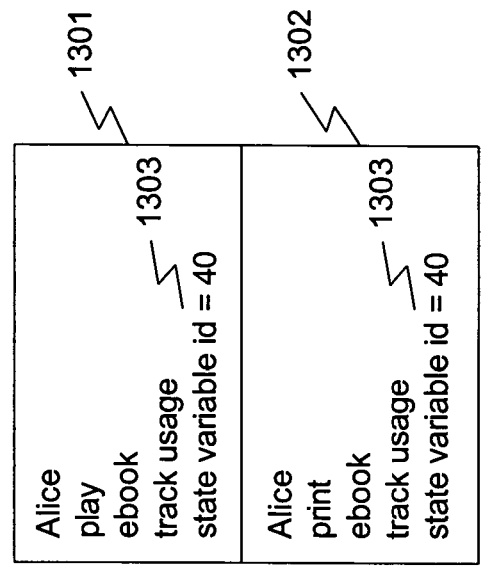
FIG. 13 illustrates employing of a state variable in maintaining a state shared by multiple rights.

Not only can state variables be shared among principals, such as rights suppliers, consumers, and the like, a state variable can be shared among multiple exercisable rights. FIG. 13 is used to illustrate employing of a state variable for maintaining a state shared by multiple rights, according to the present invention. In FIG. 13, a same state variable 1303 is associated to both a right to print 1302 and the right to play 1301, so that the total number of playing, printing, and the like, can be tracked together.

Figure 14:
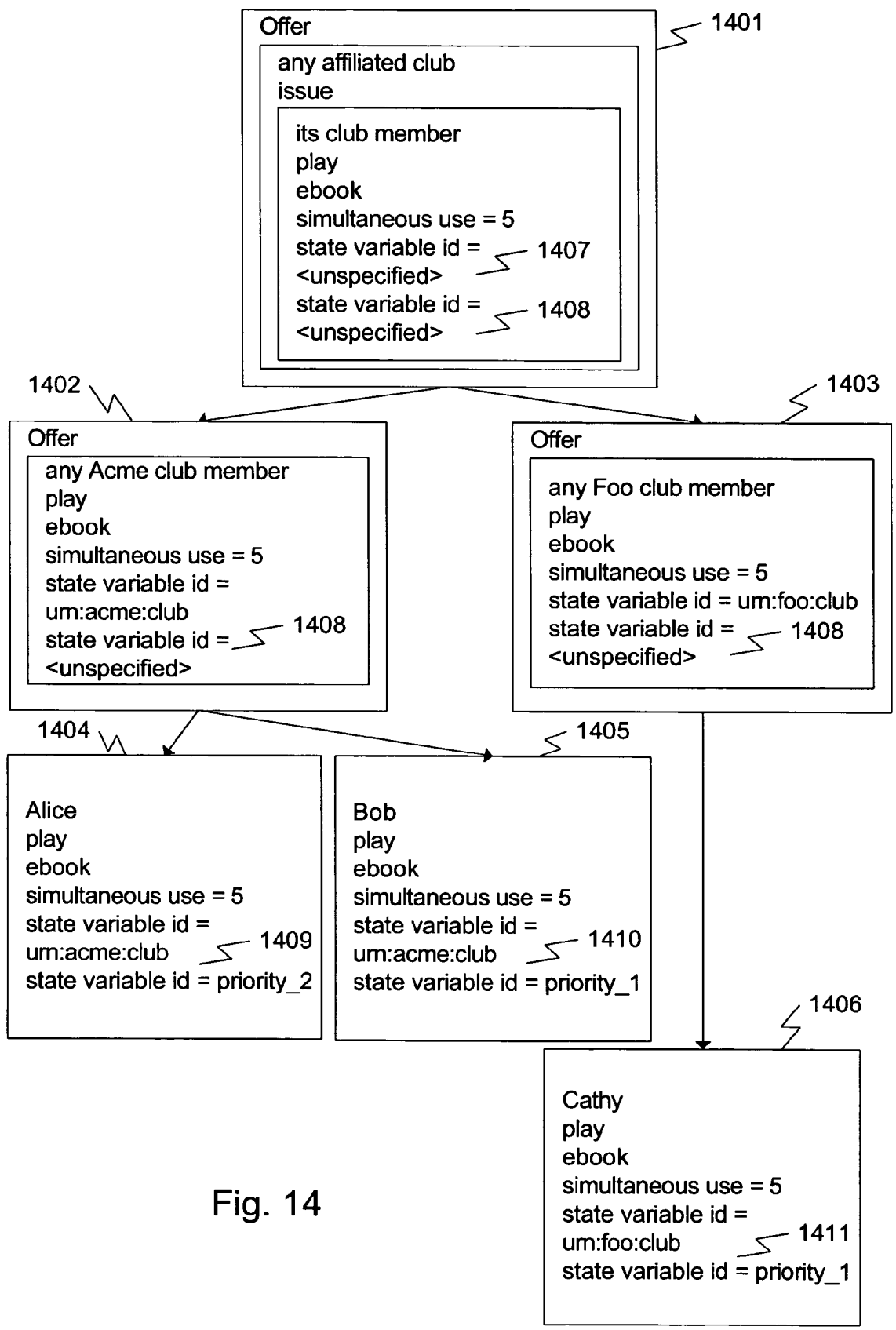
FIG. 14 illustrates employing of multiple state variables to represent one state of rights.

The state of rights can depend on more than one state variable. FIG. 14 is used to illustrate employing of multiple state variables to represent one state of rights, according to the present invention. The example described with respect to FIG. 14 builds upon the example described with respect to FIG. 12. In FIG. 14, a usage right can be tracked by employing multiple state variables 1407 and 1408 in an offer 1401. The state variable 1408, for example, representing a priority level, can stay unspecified in the corresponding offers 1402 and 1403 (e.g., site licenses). The corresponding state variables 1409-1411, for example, used for setting a priority, can be assigned to each member in the corresponding licenses 1404, 1405 and 1406. The corresponding right to view, play, and the like, can now be dependent on two state variables, effectively restricting 5 simultaneous views, plays, and the like, per priority level.

One state variable can represent a collection of states. For example, a unique identification can be used to represent a state variable, and an appropriate mechanism can be employed to map such unique id to a database of multiple variables, where each variable represents a distinct state.

The scope of state variables can be used to determine entities by which the state variables can be managed. For example, for a local state variable, usage tracking of associated rights thereof can be managed solely by a trusted agent embedded within a rights consumption environment, such as a media player, and the like. In addition, such usage tracking can be conducted by a trusted remote service, such as the common state-of-rights server 801. Further, shared global state variables can be made accessible by multiple trusted agents. To avoid privacy issues, security issues, trust issues, rights issues, and the like, associated with accessing content, such as data, and the like, included within a peer rights consumption environment, managing of such shared global state variables can be performed by a remote service, such as the state-of-rights server 801.

A counter is a common form of state variable usage. For example, such state sharing can include counter sharing where a state represents a number of times a right has been exercised, an event has occurred, and the like. Such counter sharing can be manifested in various forms and occur in many contexts, such as: tracking a number of simultaneous uses, tracking a number of sequential uses, sequencing (e.g., a commercial must be viewed before free content can be accessed), a one-time use constraint, a transaction count, a delegation control level, a super-distribution level, dependency on at least one or more services or devices, and the like.

In addition, state variables can be incarnated in a wide variety of forms. For example, a state variable can be used to track specific time slots within a period of time, such as used by a movie studio to transfer syndication rights to a specific TV station, to transfer syndication rights shared by a group of stations, to transfer syndication rights assigned through a bidding process, and the like.

State variables also can be employed, for example, with regional selling or distribution rights, in a statement from a financial clearing house to acknowledge that an appropriate fee has been paid, as a status of whether a commercial has been watched before free content can be accessed, and the like.

Figure 15:
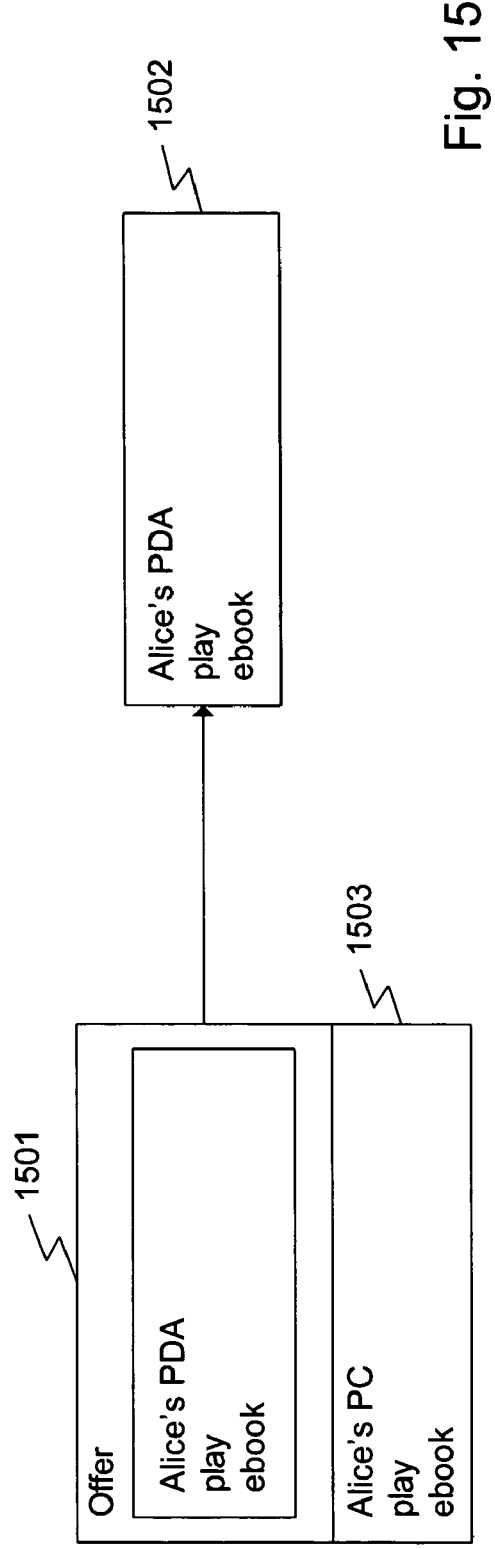
FIG. 15 illustrates a case where not all rights are associated with states.

Not all rights need be associated with states. FIG. 15 is used to illustrate a case where not all rights are associated with states, according to the present invention. In FIG. 15, an offer 1501 allows a user, Alice, to grant an unlimited play right, view right, and the like, to her PDA. Such a play right need not be associated with any state. Accordingly, derived right 1502 also has an unlimited play right to the content, as well as the right 1503 for her PC.

Figure 16:
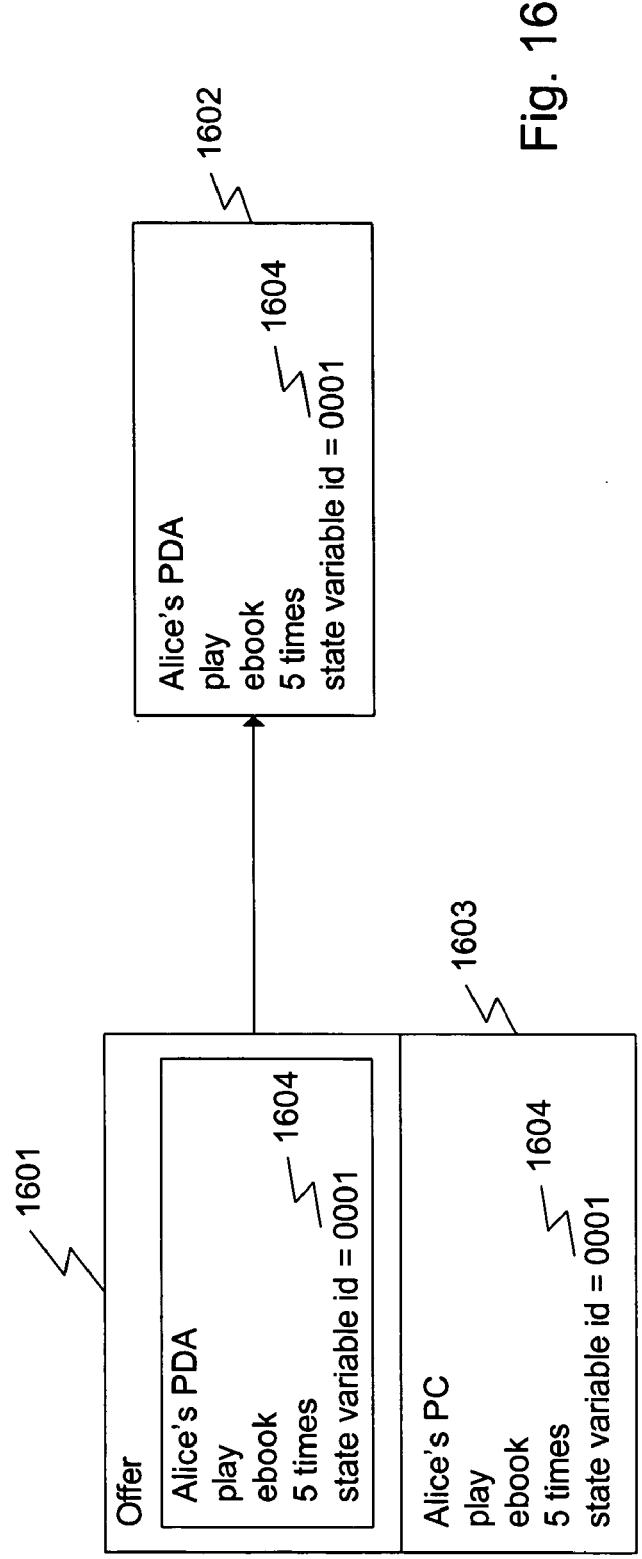
FIG. 16 illustrates a case where not all rights which are associated with states are shared or inherited.

Not all rights which are associated with states are shared or inherited. For example, some rights are meant for off-line usage, can be transferred in whole to another device, and hence are not shared with other devices. FIG. 16 is used to illustrate a case where not all rights which are associated with states are shared or inherited, according to the present invention. In FIG. 16, even though a play right 1603 of a user, Alice, a play right 1602 of a PDA of Alice, and a play right 1603 of a PC of Alice specify a same state variable identification 1604, a same state need not be shared since each device can track a state thereof locally. Advantageously, such an implementation would allow the PC and the PDA to each play the corresponding content up to 5 times.

Figure 17:
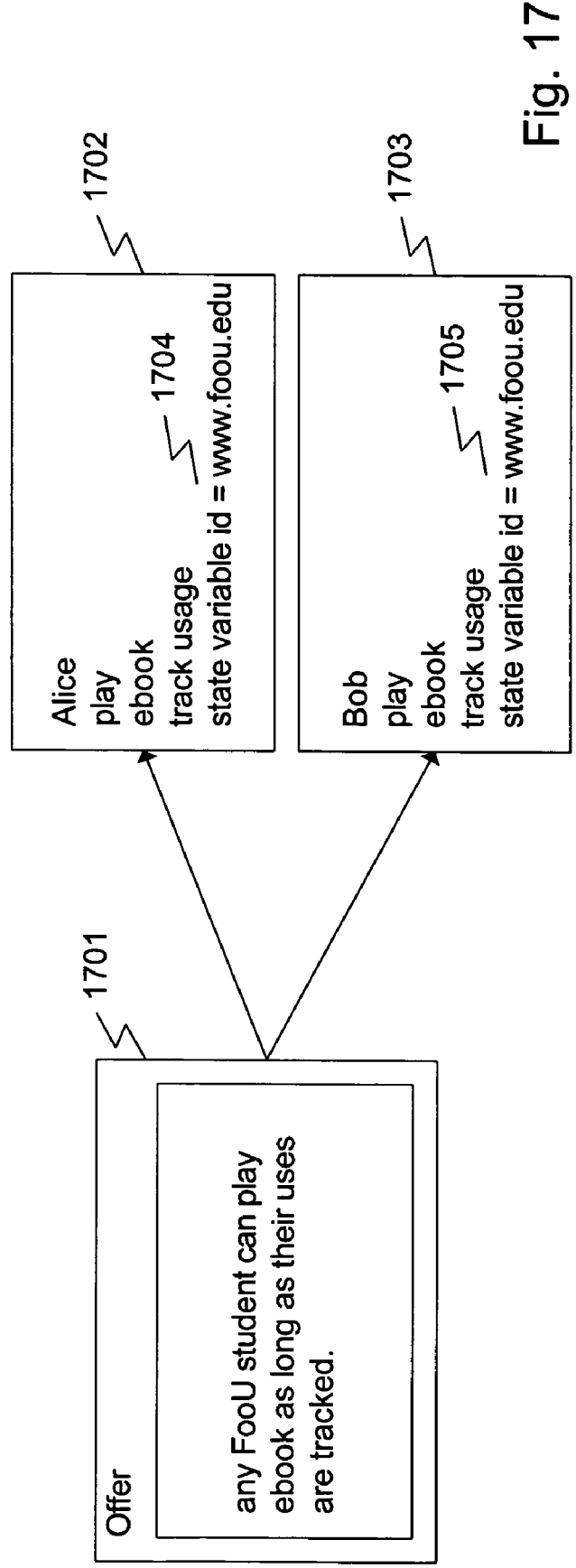
FIG. 17 illustrates a case of rights sharing based on an offer which does not explicitly include meta-rights.

FIG. 17 illustrates a form of an offer which does not explicitly include meta-rights. In FIG. 17, an offer 1701 is configured as a site license written in English. Licenses 1702 and 1703 are instances derived from the offer 1701. In an exemplary embodiment, variables 1704 and 1705 can be created based on interpretation of the offer 1701, for example, by the system of FIG. 8.

The preferred embodiments are not limited to situations where resellers, distributors or other "middlemen" are used. For example, the preferred embodiment can be applied within enterprises or other organizations, which create and/or distribute digital content or other items to control use of the content within the enterprise or other organization. Meta-rights can also be issued to end-users, when the grant of a right relates to another right. For example, the right to buy or sell securities as it is in the case of trading options and futures. Meta-rights can be assigned or associated with goods services, resources, or other items.

The invention can be implemented through any type of devices, such as computers and computer systems. The preferred embodiment is implemented in a client server environment. However, the invention can be implemented on a single computer or other device. Over a network using dumb terminals, thin clients, or the like, or through any configuration of devices. The various modules of the preferred embodiment have been segregated and described by function for clarity. However, the various functions can be accomplished in any manner through hardware and/or software. The various modules and components of the preferred embodiment have separate utility and can exist as distinct entities. Various communication channels can be used with the invention. For example, the Internet or other network can be used. Also, data can be transferred by moving media, such as a CD, DVD, memory stick or the like, between devices. Devices can include, personal computers, workstations, thin clients, PDA's and the like.

The invention has been described through exemplary embodiments and examples. However, various modifications can be made without departing from the scope of the invention as defined by the appended claims and legal equivalents.

What is claimed is:

1. A computer-implemented method for transferring rights adapted to be associated with items from a rights supplier to a rights consumer, the method comprising:
    obtaining a set of rights associated with an item, the set of rights including a meta-right specifying a right that can be created when the meta-right is exercised, wherein the meta-right is provided in digital form and is enforceable by a repository;
    determining, by a repository, whether the rights consumer is entitled to the right specified by the meta-right; and
    exercising the meta-right to create the right specified by the meta-right if the rights consumer is entitled to the right specified by the meta-right, wherein the created right includes at least one state variable based on the set of rights and used for determining a state of the created right.

2. The method of claim 1, wherein the state variable inherits a state thereof for content usage or rights transfer from the set of rights.

3. The method of claim 1, wherein the state variable shares a state thereof for content usage or rights transfer with the set of rights.

4. The method of claim 1, wherein the state variable inherits a remaining state for content usage or rights transfer from the set of rights.

5. The method of claim 1, wherein the state variable is updated upon exercise of a right associated with the state variable.

6. The method of claim 1, wherein exercising the meta-right creates a plurality of rights, wherein the state variable is shared by the created rights.

7. The method of claim 1, wherein the state variable represents a collection of states.

8. The method of claim 1, further comprising a plurality of state variables that determine the state of the created right.

9. The method of claim 1, wherein the at least one state variable is unspecified in the created right, is created during a rights transfer, and is assigned to the created right.

10. The method of claim 1, wherein the state variable is transferred from the right specified by the meta-right to the created right.

11. The method of claim 1, further comprising generating a license including the created right, if the rights consumer is entitled to the right specified by the meta-right.

12. A system for transferring rights adapted to be associated with items from a rights supplier to a rights consumer, the system comprising:
    means for obtaining a set of rights associated with an item, the set of rights including a meta-right specifying a right that can be created when the meta-right is exercised, wherein the meta-right is provided in digital form and is enforceable by a repository;
    means for determining whether the rights consumer is entitled to the right specified by the meta-right; and
    means for exercising the meta-right to create the right specified by the meta-right if the rights consumer is entitled to the right specified by the meta-right, wherein the created right includes at least one state variable based on the set of rights and used for determining a state of the created right.

13. The system of claim 12, wherein the state variable inherits a state thereof for content usage or rights transfer from the set of rights.

14. The system of claim 12, wherein the state variable shares a state thereof for content usage or rights transfer with the set of rights.

15. The system of claim 12, wherein the state variable inherits a remaining state for content usage or rights transfer from the set of rights.

16. The system of claim 12, wherein the state variable is updated upon exercise of a right associated with the state variable.

17. The system of claim 12, wherein exercising the meta-right results creates a plurality of rights, wherein the state variable is shared by the created rights.

18. The system of claim 12, wherein the state variable represents a collection of states.

19. The system of claim 12, including a plurality of state variables that determine the state of the created right.

20. The system of claim 12, wherein the at least one state variable is unspecified in the created right, is created during a rights transfer, and is assigned to the created right.

21. The system of claim 12, wherein the state variable is transferred from the right specified by the meta-right to the created right.

22. The system of claim 12, further comprising means for generating a license including the created right, if the rights consumer is entitled to the right specified by the meta-right.

23. The system of claim 12, wherein the means for obtaining, the means for determining, and the means for exercising comprise at least one of computer-executable instructions, and devices of a computer system.

24. A device for transferring rights adapted to be associated with items from a rights supplier to a rights consumer, the device comprising:
    means for obtaining a set of rights associated with an item, the set of rights including a meta-right specifying a right that can be created when the meta-right is exercised, wherein the meta-right is provided in digital form and is enforceable by a repository;
    means for determining whether the rights consumer is entitled to the derivable right specified by the meta-right; and
    means for exercising the meta-right to create the right specified by the meta-right if the rights consumer is entitled to the right specified by the meta-right, wherein the created right includes at least one state variable based on the set of rights and used for determining a state of the created right.

25. The device of claim 24, wherein the state variable inherits a state thereof for content usage or rights transfer from the set of rights.

26. The device of claim 24, wherein the state variable shares a state thereof for content usage or rights transfer with the set of rights.

27. The device of claim 24, wherein the state variable inherits a remaining state for content usage or rights transfer from the set of rights.

28. The device of claim 24, wherein the state variable is updated upon exercise of a right associated with the state variable.

29. The device of claim 24, wherein exercising the meta-right results creates a plurality of rights, wherein the state variable is shared by the created rights.

30. The device of claim 24, wherein the state variable represents a collection of states.

31. The device of claim 24, including a plurality of state variables that determine the state of the created right.

32. The device of claim 24, wherein the at least one state variable is unspecified in the created right, is created during a rights transfer, and is assigned to the created right.

33. The device of claim 24, wherein the state variable is transferred from the right specified by the meta-right to the created right.

34. The device of claim 24, further comprising means for generating a license including the created right, if the rights consumer is entitled to the right specified by the meta-right.

35. The device of claim 24, wherein the means for obtaining, the means for determining, and the means for exercising comprise at least one of computer-executable instructions, and devices of a computer system.

36. The device of claim 24, wherein one or more of the means for obtaining, the means for determining, and the means for exercising are specified in a license.

* * * * *